United States Patent
Hyman et al.

[19]

[11] Patent Number: 6,092,047
[45] Date of Patent: Jul. 18, 2000

[54] APPARATUS AND METHOD OF COMPOSING A PLAN OF FLEXIBLE BENEFITS

[75] Inventors: Andrew A. Hyman, Harrison, N.Y.; William R. Jaeger, Ridgefield, Conn.

[73] Assignee: Benefits Technologies, Inc., White Plains, N.Y.

[21] Appl. No.: 08/946,269

[22] Filed: Oct. 7, 1997

[51] Int. Cl.[7] .................................................. G06F 17/60
[52] U.S. Cl. ...................... 705/4; 705/1; 705/7; 705/35; 705/36
[58] Field of Search .............................. 705/1, 4, 7, 35, 705/36

[56] References Cited

U.S. PATENT DOCUMENTS 5,590,037 12/1996 Ryan et al. ................................. 705/4

OTHER PUBLICATIONS

Linda Stern, Flex plans on the rise, Data Watch, pp. 1–7, 1991.

Primary Examiner—Edward R. Cosimano
Assistant Examiner—Raquel Alvarez
Attorney, Agent, or Firm—R. Lewis Gable; Cowan Liebowitz & Latman PC

[57] ABSTRACT

There is disclosed a method and apparatus for devising the financial aspects of a plan of benefits for a given population of employees in accordance with goals set by an employer of the employees. This invention enters data into a memory of a computer system reflective of the employees, the costs of the benefits and the employer's goals. Next, variables are defined and entered into the memory reflecting the costs of the benefits, and a set of relationships is constructed of the cost variables in a manner to constrain the cost variables in accordance with the plan of benefits. Finally, the set of relationships is processed in the computer system to provide at least one set of solutions of the cost variables.

27 Claims, 6 Drawing Sheets

APPARATUS AND METHOD OF COMPOSING A PLAN OF FLEXIBLE BENEFITS

FIELD OF THE INVENTION

This invention relates to data a processing systems and, in particular, to such systems for composing a plan of flexible benefits.

BACKGROUND OF THE INVENTION

Data processing systems implemented by programmed computers have been used in a variety of different ways with respect to a variety of insurance products and to employee benefits in general.

U.S. Pat. No. 4,648,037 of Valentino relates to a software system for permitting employees to access information by a terminal connected to that system. The system is capable of displaying on demand the value of their savings plans, withdrawal information, benefit information re the employee's life insurance, disability insurance, vested retirement etc.

U.S. Pat. No. 4,837,693 of Schotz relates to a computerized system for implementing and administering a group life insurance plan, which has conversion rights. The system gathers employee and employer information and summaries that information to generate and display reports. The system also calculates employee contributions.

U.S. Pat. No. 5,429,506 of Brophy et al. relates a premium paying corporate life insurance plan with a voluntary employee group life plan. In particular, the system determines the split of premiums between the employer and the employee in a manner to give the employee a death benefit and to permit the employer to invest funds in the cash value of a single life insurance contract.

U.S. Pat. No. 5,191,552 of Bosco et al. relates to an integrated computer system including a plurality of data processing systems, each system for administering at least one of the underwriting, administration and actuarial functions. The data processing systems are tied to an enterprise-wide relational data base.

U.S. Pat. No. 5,590,037 of Ryan et al. relates to a computer system for generating a financial forecast for a life insurance contract, and creating a model or an illustration of a life insurance contract subject to an indenture as a means for prefunding future employee benefits.

U.S. Pat. Nos. 4,969,094 and 4,750,121 of Halley et al. relate to a system for administering a wide range of insurance activities including enrolling employees, receiving periodic employer payments, investing in securities, receiving death benefits of the enrolled employees, distributing payable benefits, funding those benefits payments by investing those proceeds, and employing life insurance policies with one-year term dividend rider components.

U.S. Pat. Nos. 5,446,653 of Miller et al. and 5,272,623 of Grubb et al. both relate to a computerized system for putting together select clauses to generate an insurance contract for a particular purpose.

U.S. Pat. No. 3,634,669 of Soumas et al. discloses a portable computer to be used by a salesman for determining the insurance requirements of a prospect.

None of the above discussed patents relate to the use of a computer system for helping an employer evaluate financial aspects of insurance and other benefits for inclusion in a flexible benefit plan for its employees. The differences and disadvantages of traditional or fixed, as opposed to flexible, benefit plans are well recognized by one skilled with employee insurance and benefit programs. The key distinction is that fixed plans require each employee under that plan to accept a preset package of benefits. However, it is apparent that each employee will have significantly different needs and wants. Thus, the use of a fixed benefit plan can lead to inefficient spending on the part of the employer, since employees are likely to receive benefits that they don't need or want. In a flexible benefit plan, employees are able to choose the benefits that they need or want. For example: If given the opportunity to choose from a menu of benefits, a 25-year-old single employee may tend to choose a basic health plan and disability insurance. A 37-year-old employee with a family may tend to choose a "richer" health plan, life insurance, disability insurance, and to fund his/her retirement plan. The 50-year old with grown children may typically choose a health plan, long-term care insurance, and funding for his/her retirement plan. Flexible benefit plans may include some benefits provided as a floor for all employees, such as term life and long term disability insurances.

One difference among employees is the family status of each employee. Family status in turn can determine the benefit needs and, in particular, the medical insurance needs of an employee. For example, one employee may be single, another married and still another married with children. In addition to family status, a particular employee may not need a particular health coverage. For example, a married employee may have a spouse who already has a full family health insurance coverage. As a result the needs of that employee are different and, if he or she had the choice, would elect not to have that potentially redundant health coverage, particularly if the employee could receive a compensatory allowance for opting "out" of the employer's health coverage. It is contemplated that the employee could use that allowance to fund some other benefit or upgrade a particular benefit as would be more needed by that employee. Thus, there is a win-win situation for both the employee and the employer.

Thus, it is evident that the flexible benefits approach permits more efficient use of the employer's benefit dollars, since the employer is no longer spending for benefits that employees may not need or want.

Recent surveys support the concept that employees prefer flexible benefit plans and the opportunity to choose their own unique set of benefits. According to a 1995 Workplace Pulse Survey, 99% of employees say that choice in benefits is important, while 88% say that choice is very important. 63% say that they would be willing to pay more for benefits if they had a choice in selecting those benefits. In a 1994 Workplace Pulse Survey, 38% of employees indicated that they had benefits that they do not need and would not use.

Flexible benefit plans are not new. Many employers, particularly large companies, have adopted such plans. The drawback particularly for smaller companies is one of cost. Many flexible benefit plans are presently prepared by teams of consultants, accountants and actuaries. Often plan preparation is so expensive that incurring such costs appears practical only to large companies with a large employee base and benefit budget. Recent surveys tend to support such a cost constraint factor. According to a 1994 KPMG Peat Marwick Survey, 69% of the companies with 1000–4999 employees have flexible benefit plans. On the other hand, according to a 1994 Johnson & Higgins Survey, 4% of companies with fewer than 500 employees have flexible benefit plans.

A primary requirement of any benefit plan, at least from the perspective of the employer, is the ability to control the cost of its benefit plans. In a traditional fixed benefit plan, the employer controlled costs by defining the benefits its employees will receive and shopping the market for the best, reduced cost benefit products. In a flexible benefit plan, the employer controls costs by defining its contribution or the amount at which the employer will underwrite the benefit plan. For the employer, the ability to control and, in accordance with the teachings of this invention, even to set an exact dollar cost for the entire benefit plan may be a significant motive of an employer to adopt a flexible benefit plan. Another motive may be that by selecting only the products wished or needed, an employee obtains better perceived value for the employer's, and any of his or her own, funds.

The list of benefits may include at least: point-of-service (POS) medical product, health management organizations (HMO) medical product, Preferred Provider Organization (PPO) medical product, indemnity medical product, staff model HMO medical product, group short and/or long term disability, individual short and/or term disability, sick leave group term life insurance, accidental dismemberment and disability (AD&D) insurance, group universal life insurance, individual term life insurance, individual universal life insurance, whole life insurance, spousal or dependent life coverage, a 401(k) or other tax preferred retirement program, defined contribution retirement plan, defined benefit retirement plan, profit-sharing retirement plan, indemnity dental, health maintenance organization (HMO) dental, Preferred Provider Organization (PPO) dental, premium only Section 125 plan (a mechanism to provide many of the benefits on a tax preferred basis), medical reimbursement Section 125 account, dependent care Section 125 account, vision, prescription drug, prepaid legal, long-term nursing care, hospital income and dread disease.

The complexity of the evaluations needed to compose or structure a flexible benefit plan are apparent. In addition to many different benefits available, plan structuring must also consider different mixes of benefits as selected by each of the number "N" employees of a given employer, the number "s" of different classes (logical groupings) of employees, the selected employer contribution(s) to each class of employees, and the elections by each of the "N" employees to opt "out" or "down" for a particular benefit. The number of variables to be considered is great and the cost of analyzing them is high, particularly if done by teams of consultants, accountants and actuaries. The above noted references describe the use of known data processing systems with programmed computers to compose insurance contracts and to report the current status of benefits including terms and coverages to beneficiaries. However at least prior to this invention, computers have not been adapted to the complexities of composing or structuring the financial design of a plan of flexible benefits.

Linear programming is an often used mathematical approach to make business decisions and, in particular, to develop a model whereby the limited resources of a business are employed to maximize profit. The use of liner programming is described in "Sets, Matrices, and Linear Programming" by Robert L. Childiss (Prentice-Hall—1974), Chapter 5—Linear Programming, Chapter 6—The Simplex Method, Chapter 7—Duality and Sensitivity Analysis, Chapter 8—Transportation and Assignment Problems, and Chapter 9—Integer Programming, pp 140–340. This reference is, however, silent as to the use of linear programming to the various problems of planning a plan of flexible benefits, much less how such techniques could be applied to devise benefit plans.

SUMMARY

It is an object of this invention to construct a flexible plan of employee benefits in a relatively short period of time, and, in place of the prior art's reliance on a team of benefit consultants and accountants, employ a programmed computer to define the optimum financial aspects of the benefit plan.

It is a further object of this invention to define a set of goals which this flexible plan should meet and, even further, to priortize these goals.

It is a still further object of this invention to permit an employee to repetitively set and reset the goals and the priorities attached to these goals and to produce a sequence of solutions of the financial aspects whereby the employer may adopt that plan with those financial aspects best suited for the employer.

In accordance with these and other objects of this invention, there is disclosed a method and apparatus for devising the financial aspects of a plan of benefits for a given population of employees in accordance with goals set by an employer of the employees. This invention enters data into a memory of a computer system reflective of the employees, the costs of the benefits and the employer's goals. Next, variables are defined and entered into the memory reflecting the costs of the benefits, and a set of relationships is constructed of the cost variables in a manner to constrain the cost variables in accordance with the plan of benefits. Finally, the set of relationships is processed in the computer system to provide at least one set of solutions of the cost variables.

In a further aspect of this invention, the determining of the financial aspects of the plan of benefits includes the setting by the employer of goals which the plan should meet. In turn, the goals are ranked in accordance with a set of priorities determined by the employer. In order to implement these goals, a set of relationships are defined to variously include a first set of the variables indicative of the costs of the benefits and defining the goals to be met by the plan to constrain the cost variables. Further, an objective relationship is defined to include a second set of variables selected from the first set of variables in accordance with the goals. A variable solving program is used to obtain a sequence of sets of optimum solutions of the amounts of the cost variables, each set of optimum solutions reflecting a different set of priorities.

In a further feature of this invention, employers can repetitively alter the set of priorities, whereby each set of solutions reflects its particular set of priorities.

In a particular embodiment of this invention, the set of relationships includes a set of linear equations, and an objective row.

In a particular embodiment of this invention, the employer assigns priorities by inserting a plurality of coefficients into the objective row, each coefficient being related to a corresponding variable of the second set and its amount set in accordance with the ranked order determined by the priorities of the employer.

DESCRIPTION OF THE PREFERRED EMBODIMENTS

Figure 1A:
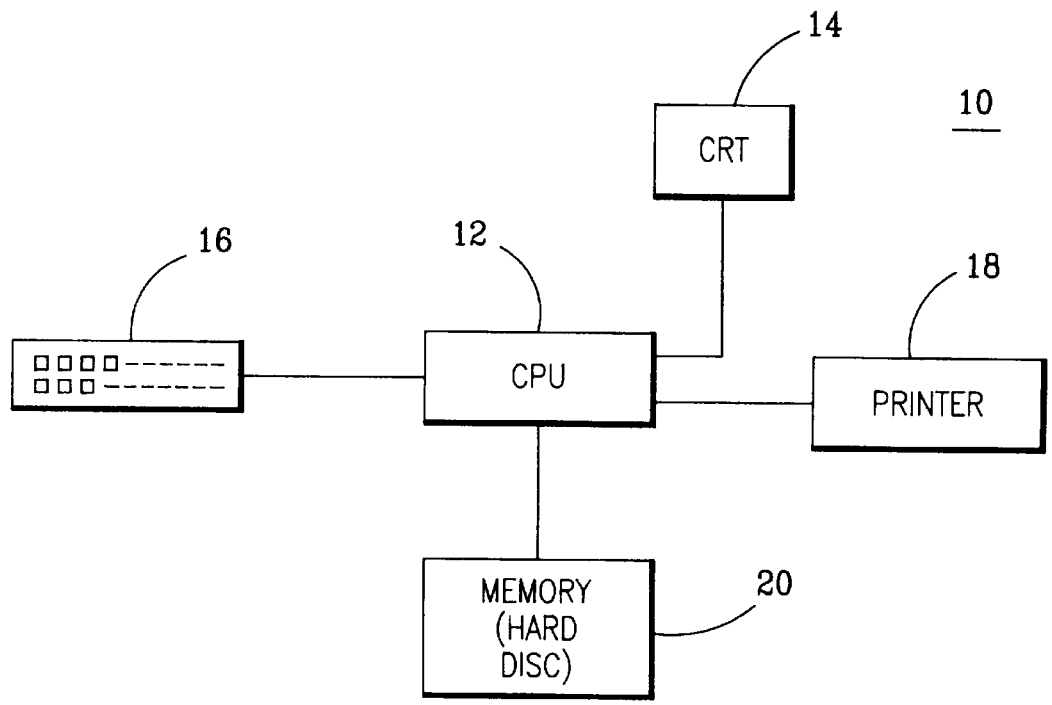
FIGS. 1A and 1B are respectively a functional block diagram of the computer architecture of a data processing system employed in accordance with the teachings of this invention to compose a flexible benefit plan, and a more detailed diagram of a memory incorporated into the system of FIG. 1A illustrating its various distinct files.
Figure 1B:
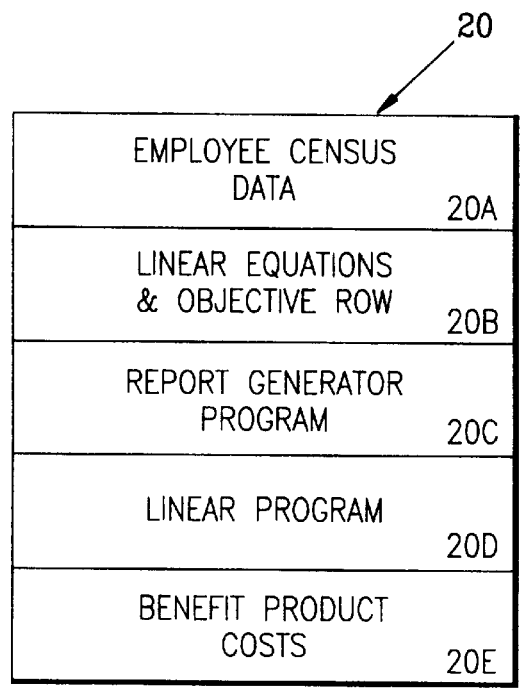

With respect to the drawings and in particular to FIG. 1A, there is shown a data processing system 10, which is programmed to enter and to process data whereby a plan of flexible benefits is devised in accordance with priorities of the employer. The system comprises a control processing unit (CPU) 12, a data display device in the form of a cathode ray tube (CRT) 14, a printer 18, a data input device in the form of a keyboard 16 and a data memory 20. As illustrated in FIG. 1A, the CPU 12 is connected separately with each of the CRT 14, the printer 18, the keyboard 16 and the memory 20. As illustrated in FIG. 1B, the memory 20 is divided into a plurality of distinctly addressable files 20A–20E for storing specific data and programs therein as will be explained.

Figure 2A:
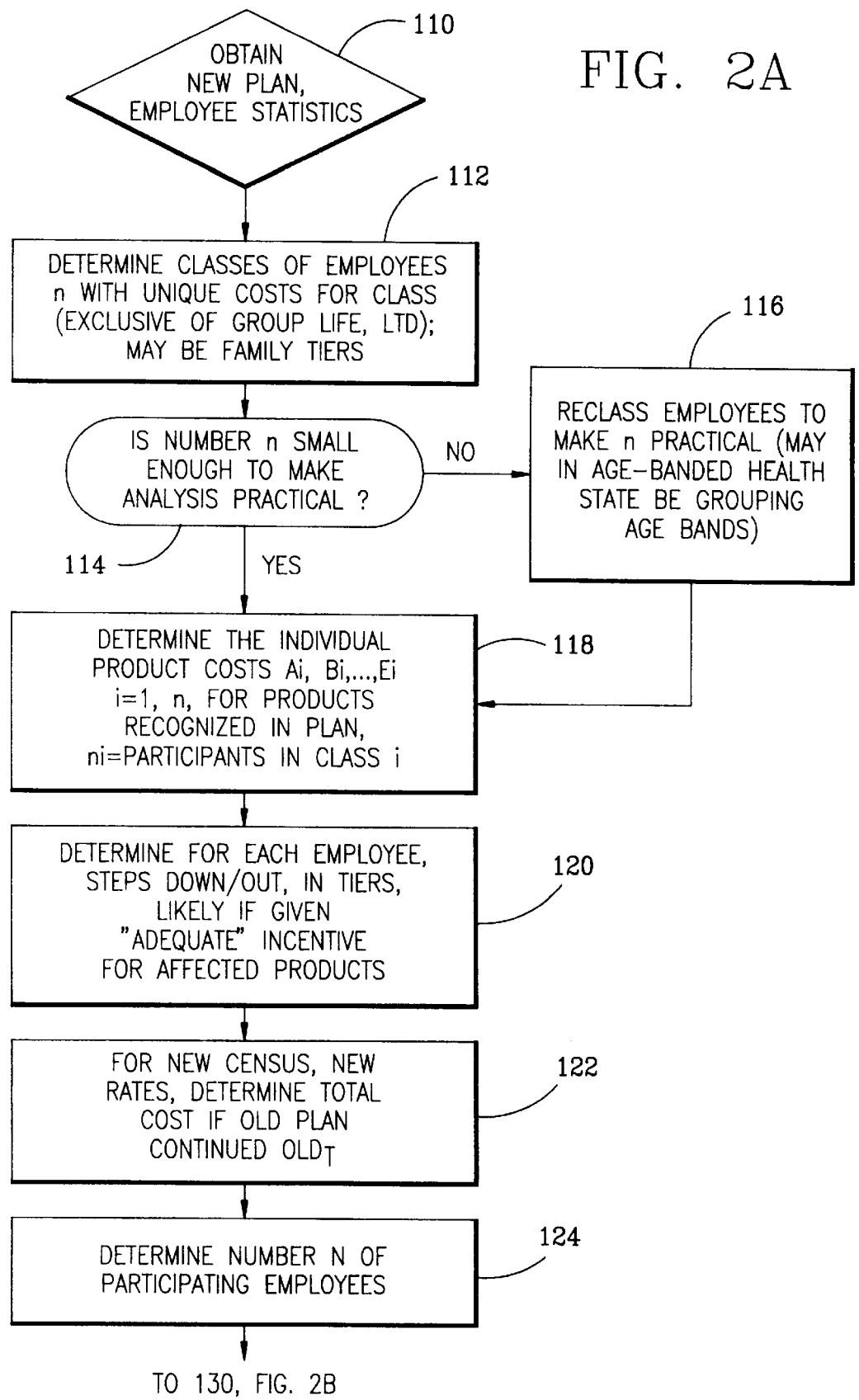
FIGS. 2A and B are flow diagrams of a computer program executed by the computer shown in FIG. 1 to facilitate the inputting of data relating to a census of present employees of a given employer, the various benefits selected by the employer to be considered in its financial design of a flexible benefit plan, the costs of such benefits and the employee elections with regard to opting "out" or "down" of the various benefits.

Referring now to FIGS. 2A and B, there is disclosed a flow diagram which helps the employer to prepare the financial structure of a flexible benefit plan for its employees, to select the benefit products to be included within that plan, to identify the products included within its old fixed plan, to enter census data for the current population of employees and to enter the cost of the benefit products included within each of the new and old plans, whereby the total costs to the employer of each of the old and new plans may be determined. The total costs of the new and old plans are critical to the employer's evaluation of these plans.

The total costs, as well as the underlying data entered by the flow diagram shown in FIGS. 2A and B, define the values of constants, which are included in a set of linear equations or inequalities. As will be explained, these equations are constraints by which the financial design of the new flexible plan of benefits will be constructed. The data indicative of the total costs and the underlying data is named and structured in terms of certain parameters and fixed constants. For example as explained above, there is a given number "N" of employees for a particular employer. The "N" employees are divided into a number of classes "i" of employees, where "i" varies from 1 to "s" and "s" is the number of classes, illustratively by position in company, geographic location, family/marital status or age band. For example if class is to be determined by family status alone, the number of classes may illustratively be 4 (s=4) and the four classes may include: 1) "single" (i=1), 2) "employee+spouse" (i=2), 3) "employee+child" (i=3) and 4) "family" (i=4). In this class structure, "family" indicates that the employee's spouse and one or more children are also to receive coverage in addition to the employee. The applicable, natural class (i) for an employee reflects the coverage to be nominally provided by the employer based on the present family status of the employee.

Referring now to FIG. 2A, the structuring of a new, flexible benefit plan and, in particular, the entry of employee statistics begins in step 110. Next in step 112, the classes of employees receiving benefits, wherein the costs may be uniform or nearly uniform within each such class, are defined and entered into the data processing system 10. The structure of the classes and a name (or address) for each class are entered in step 112, e.g., via the keyboard 16, to be stored in file 20B of the memory 20. For example, the cost of certain benefits may depend on the age of the employee. Such benefits with unique employee dependent costs, which include for example group life insurance and long term disability, are identified. Next in step 114, the number "s" of classes is analyzed to determine whether the number "s" is sufficiently small to render this analysis practical. A classification scheme such as described above where there are four classes ("s"=4) ranging from "single" to a full "family" is practical. A scheme in which a spouse and each child constitutes another class and requires another rate may also be practical. Another scheme that may or may not be practical would be a situation in which the rates for each of the four classes just mentioned may be age band dependent, and that there are, as a result, a large number of classes.

If step 114 determines the number "s" to be so large to be impractical, step 116 would devise an alternative scheme that reduces the number of classes. For example, a class may be redefined to include a wider "band" of ages, as opposed to a class defined as that age dependent benefit limited to a single age or a narrow band of ages. To that end, it may be appropriate to obtain from the employer an indication of whether rates may be averaged within each of the four classes. It also would be pertinent to determine whether the employer would make contributions, from which an employee could draw for his/her age-class combination, or would use a weighted average or median value for costs assigned to its employees in a class. In addition, the number of classes may be reduced for the employer to explain more clearly its method of contribution to its employees. In another embodiment, there are a plurality of recognized classes in which benefit rate distinctions are treated by formula or by table for purposes of financial plan design.

Selected of the linear equations include parameters such as the cost for each benefit or product, which is represented by a letter. For example, the cost for health insurance for class i identified by "$A_i$", a dental plan by "$B_i$", life insurance by "$C_i$", etc., as shown in Step 118. The number of employees in each natural class as defined by the actual family status of an employee is "$n_i$". In step 118, the cost for each benefit in each class, $A_i, B_i, C_i \ldots E_i$, is determined and entered into the data processing system 10. The benefit rate and cost data entered in step 118, e.g. via the keyboard 16, is stored in file 20E of the memory 20. In this instance, the letters A, B, C referred to above identify the products of the present benefit plan. As will be explained these values will be used to calculate the costs of the present fixed plan and to compare those costs of the fixed plan with respect to the costs of a new plan of flexible benefits as devised in accordance with this invention.

In step 120, a determination or an estimation may be made of the reduction or elimination of certain coverages by each employee and entered into the system. As explained above, an employee may elect in a flexible plan to opt "out" of or "down" from the selection of the benefits offered in the new, flexible plan. For example, consider the medical insurance; the spouse of the employee may receive a richer medical insurance plan covering the entire family or the spouse. Thus, the employee may elect depending upon the independently provided medical insurance of the spouse, to opt "out" of any medical insurance or to opt "down" to receive only the employee-child option from his/her employer. In the contemplated benefit structure, the benefit, e.g., medical insurance, is tiered in steps according to the extent (and cost) of the coverage as follows. The richest, most extensive coverage is provided for the family class. The next most extensive coverage may be for the employee-child class, followed in order by couple and single classes. The employee may be permitted to opt "down" to one of the lower levels of coverage and, even, to opt "out" completely of any medical insurance.

The structure of these reductions may be proscribed by the employer or the law. For example, an employee my be prevented from eliminating a medical coverage unless the employee has an alternate source for that medical coverage.

The employer may encourage its employee to opt "down" and/or "out" by offering monetary incentives in the form of allowances. The amount of the allowance depends on the coverage reduction, i.e., the move from one class of coverage to another and is selected to induce the employee to opt down or out. The employer may wish to poll its employees as to which amounts would be effective incentives to its employees. In this specification, the monetary incentive provided by the employer to its employees to opt "down" or "out" is termed an "allowance" and is identified in the linear equations as ALLOW.

An opt "down" or an opt "out" move generally is an advantage to both of the employer and employee. For the employer, the cost is the monetary allowance, which is the incentive for the employee to accept the coverage reductions. The amount of the allowance is illustratively set such that the employer saves at least the difference between the cost of the coverage in the employee's nominal class versus the reduced cost for the coverage of the new class to which the employee opts to move. Similarly, the employee is ahead by the amount of the allowance plus the lower cost of the coverage (or avoidance of coverage cost altogether if opting out).

Design of the linear equations may be facilitated by obtaining either from the employer or, if necessary, polling the employees an estimate of how many employees are likely to opt down or out at a large enough incentive. The structured reductions or moves should not interfere with the solution of the linear equations.

In particular in step 120, an indication for each employee is made as to whether the employee elects a change in the benefit coverage and the nature of that move. Illustratively, the employer may estimate the number of employees who it believes will make a coverage change or may poll its employees for this information. Also in step 120, data reflecting the present, actual family status of each employee, as well as the election made by each employee as to whether to opt "down" and/or "out", is entered into system 10, to be stored in file 20A of the memory 20.

In step 122, the total cost, as represented by the variable "$OLD_T$" for the old, fixed benefit plan and its set of benefit products is determined. As will be described below, the present, total cost for the old benefit plan "$OLD_T$" will be compared for evaluation purposes with a variable "$COST_T$", which is the total cost of the new, flexible plan. Next in step 124, the number "N" of participating employees in the current census of employees is determined and entered into the system 10. Data reflecting the number "N" of participating employees is stored in file 20A of the memory.

Figure 2B:
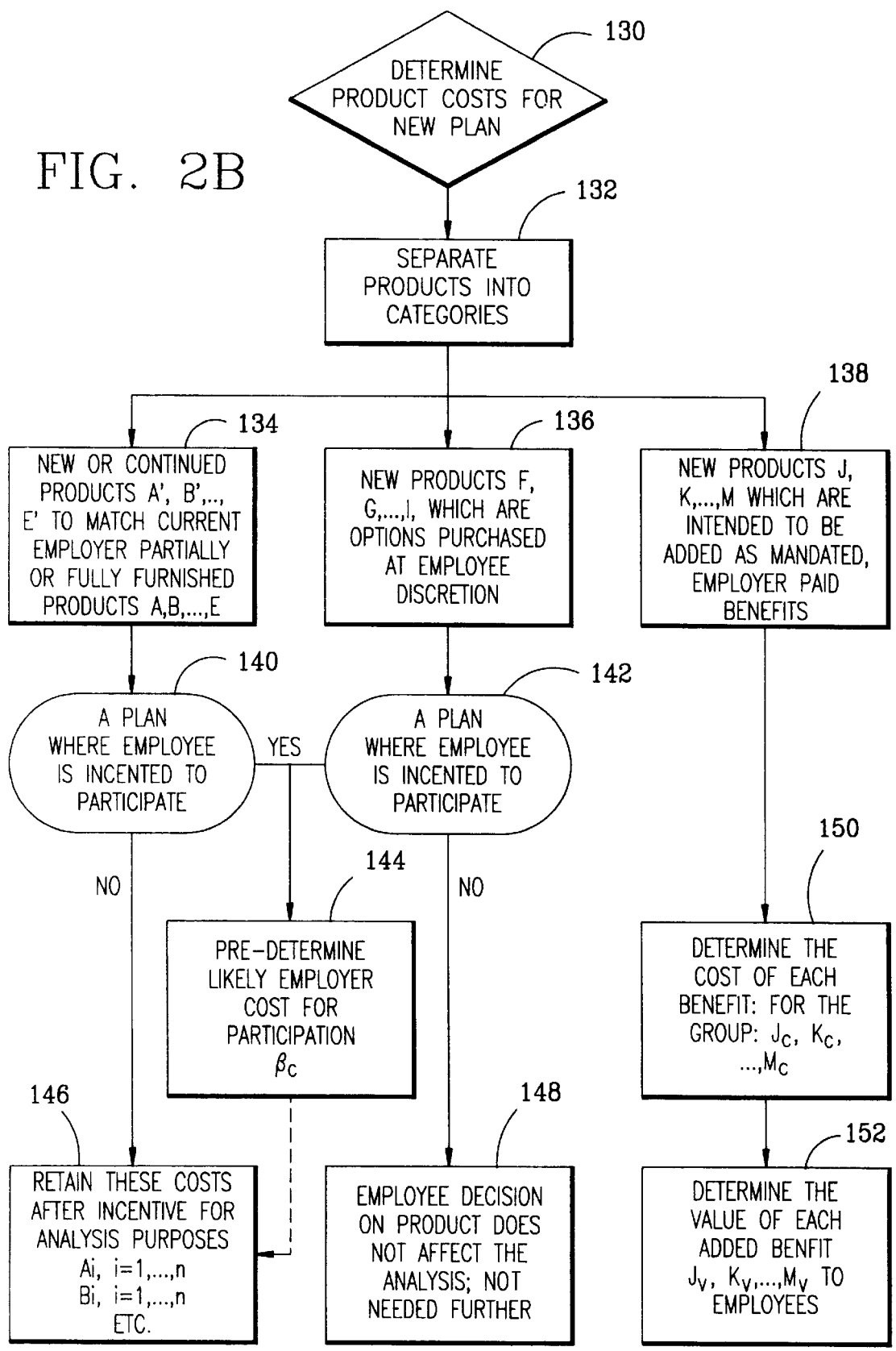

In the next step 130 as shown in FIG. 2B, the component costs of the variable total cost "$COST_T$" of the new, flexible benefit plan are determined. First, in step 132, each new product or benefit is separated into 3 categories.

The first category is identified in step 134 as those new or existing products A', B', C', . . . E', which are to be included in the new, flexible plan of benefits and also correspond to the products A, B, C . . . E of the present fixed plan. Designations A and A' are used to refer to the same or to a comparable product in this evaluation. The cost of these benefits in this first category are to be funded by the employee and possibly by supplemental contributions to be provided by the employer, as will be explained.

In step 136, the second category of products is identified as those flexible benefit products F, G, H . . . I which are to be included in the new, flexible plan of benefits but do not correspond to products included in the current plan of fixed benefits. As with the first category of benefits, the cost of these benefits in the second category may be funded by the employee or the employer, or both in combination, as will be explained.

The third category is identified in step 138 as those fixed benefit products J, K . . . M which are to be included in the new flexible plan of benefits but which do not correspond to any products included in the current plan of fixed benefits. The products in the third category are mandated and illustratively paid for solely by the employer. There are several reasons why an employer would want to mandate a particular product. For example, an employer may wish to obtain life insurance for the entire group, either as a matter of policy as something every employee should have, or more particularly because certain employees would not be able to obtain individual life insurance because of high risk circumstances. Similarly, a basic long term disability policy may be something an employer feels is appropriate to all employees. Further, costs on such mandated policies, especially long term disability, may be a small fraction of the cost if everyone were to obtain such a policy on a voluntary basis.

After the products are categorized, the program reflects whether the employer elects to make monetary contributions, termed in this instance subsidies, for at least a part of the cost of the products A', B' . . . E' and F, G, H, . . . , I in the first and second categories, in addition to any other contribution, e.g., the opt "down" or "out" allowances, that the employer may furnish its employees. Illustratively, the employer may give these subsidies to provide monetary incentives to employees to accept selected products in the first category. In step 140, a signal or flag is set as to whether the employer will provide these subsidies to fund, at least in part, the cost of the benefits of the first category. Similarly, step 142 sets a signal or flag as to whether the employer will fund, at least in part, the benefits of the second category. Then step 144 determines the total expected cost $\beta_c$ to be borne by the employer for selected of the products in the first and second categories. More particularly, $\beta_c$ is the sum of those contributions made by the employer to its employees, termed herein as "participation cost reductions" for each of the selected products A' to I. As described below, the employer does make other monetary contributions to its employees. These cost reductions reflect the intent of the employer to induce its employees to select certain of the benefits A' to I and, thereby, raise the participation of its employees in certain employer selected benefits. The cost defined above for a particular product for a particular class of employees, e.g., $A_j'$, does not reflect the actual cost of that product for that class, but instead the actual cost for the product less the employer's participation cost reduction. The amount of a particular participation cost reduction may be based on a selected percentage of the actual product cost or a fixed amount which the employer is willing to contribute and the current employee data and, in particular, the decision by each employee as to whether or not to elect one or more of these products. The total cost variable $\beta_c$ is stored in step 144 for further use. If step 140 indicates that the employer will not fund any of the new or continued voluntary products in the first category, step 146 still saves the costs of the products for analysis purposes, e.g., comparison with cost of the products in the present fixed plan. If step 142 indicates that the employer will not give incentives for any of the voluntary products in the second category, step 148 will discard the cost of the products in the second category. For products in the first category, there are present and new costs for each of the employer and employee (even if zero). These costs are needed for comparison purposes of the present and new plans, i.e., how much better or worse off the employer or employee may be under the new flexible benefit plan. By contrast, those new products in the second category may affect any employer contribution, but do not have any analysis impact on the employees other that in total, the employees will benefit from any employer contribution.

With regard to the third category of benefits, step 150 determines the cost of each new product J, K, . . . M, which costs are designated Jc, Kc, . . . Mc respectively, and saves these costs for further analysis. Then in step 152, the program determines the value of each of the products Jv, Kv . . . Mv to each of the employees. For example, an employer may provide a mandated long term disability insurance benefit. There are at least two possible financial values to the employees for such a benefit. One would be that the cost of the long term disability insurance plan to the employer remains unaltered. However, if each individual were to obtain identical coverage on a voluntary basis the cost might be significantly more to the employees. Thus, providing low cost disability insurance may be considered to have a greater value than the total group cost to the employees. Step 152 calculates the cost or value of the benefits added to the new flexible plan based on the current employee census data including the current number of employees and the new rates or costs for all of the selected benefit products. This cost data realized from step 152, as well as the estimated cost for employer contributions, i.e., allowances, for employees opting to opt "down" and/or "out" as determined in step 144 and the employee election of certain of the products in the new flexible plan as determined in step 146, are saved in memory for use in further calculations described below.

Figure 3A:
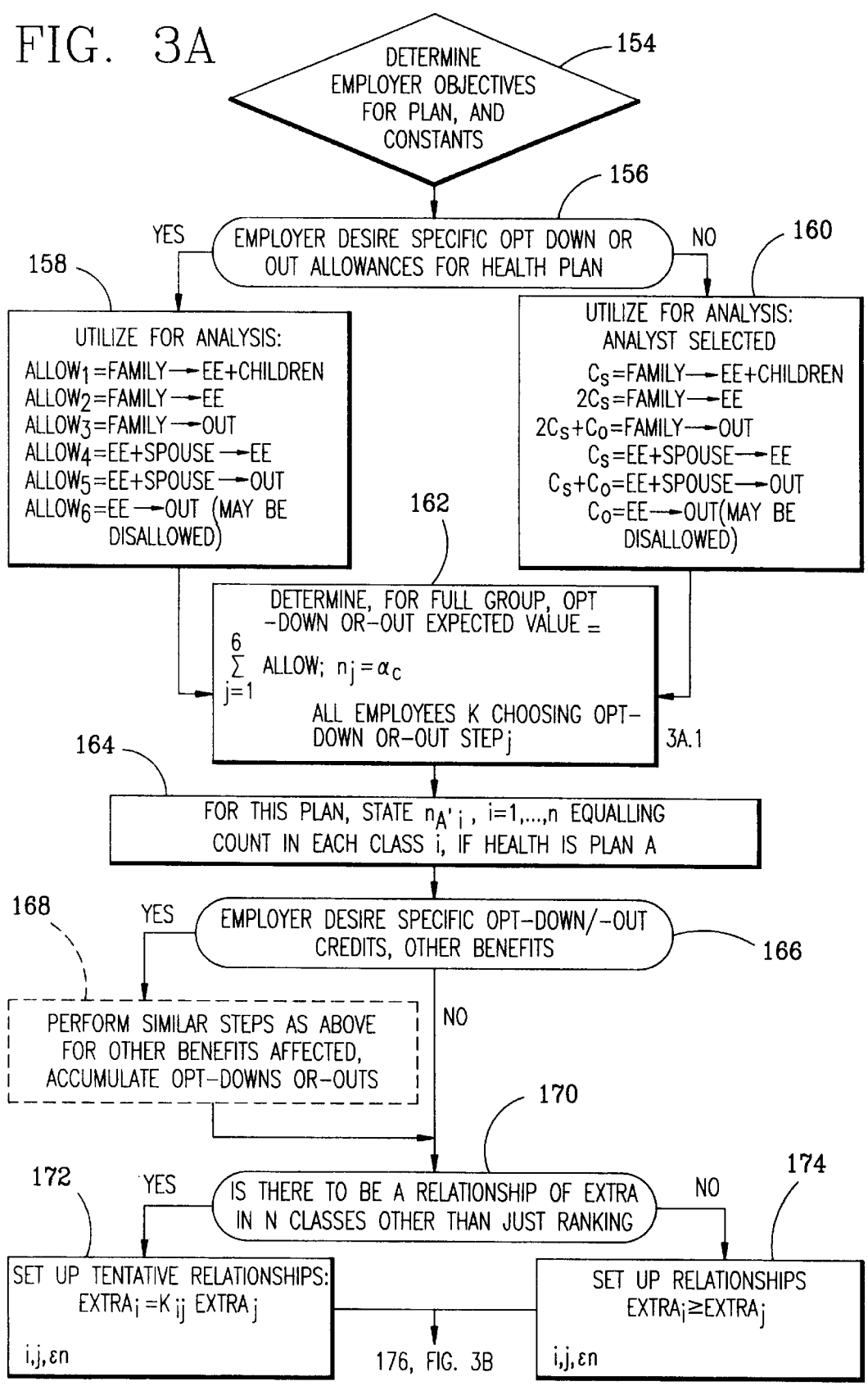
FIG. 3A and B are a flow diagram of a computer program executed by the computer shown in FIG. 1 for processing that data entered by the program of FIGS. 2A and B and to structure a linear program model comprising an objective row and a corresponding set of linear equations and/or inequalities, whereby a flexible benefit program is devised in accordance with the employer's objectives and priorities.
Figure 3B:
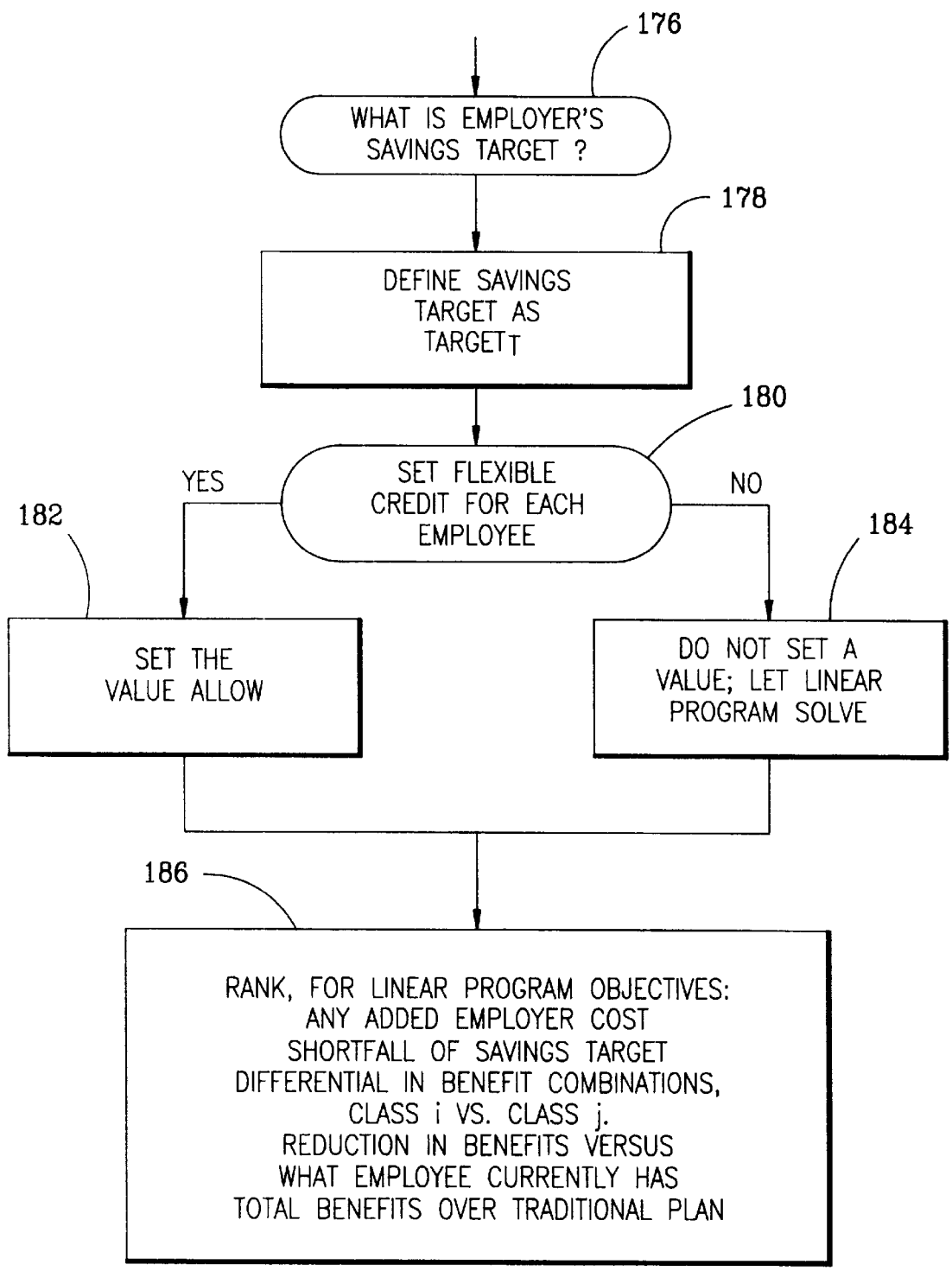

In FIGS. 3A and 3B, a flow diagram starting in step 154 is shown which permits the employer to select the benefit products for the new flexible plan and to structure the new plan in accordance with the employer priorities as well of those of the employees. In step 156, the employer determines whether the amounts of the allowances to employees for opting "down" or "out" of a particular benefit are to be set by the employer or are to be determined by inserting the allowance parameters ALLOW into the set of linear equations to be solved by the linear program. Illustratively, the election made in step 156 relates to health insurance. If in step 156 the employer elects to set the amounts of the allowances, step 158 permits the employer to set specific amounts for the potential opt "downs" or "outs" allowances $ALLOW_1$ to $ALLOW_6$, which correspond to the illustrative six moves "j" which an employee may make.

In this example, the employee is classified based upon his or her natural family status to one of "s" classes, where "s"=4. The first class is "family", where the employee is married with children; the second class is "EE+spouse" where the employee is married without children; the third class is "EE+Children" where the employee has children but no spouse, and the fourth class is "EE" where the employee is single. As shown in FIG. 3A, there are illustratively 6 different "down" or "out" moves that an employee may make. If the employee is classified as "family", he or she may opt for one of at least three moves. The first move permits the employee to opt "down" from the "family" coverage to the "EE+children" coverage, whereby the employee receives an allowance $ALLOW_1$. The second optional move permits the employee to opt "down" from the "family" to the single or "EE" coverage, whereby the employee receives the allowance $ALLOW_2$. The third move permits the employee to opt "out", whereby the employee receives an allowance $ALLOW_3$. The fourth move permits the employee to opt "down" from the "EE+spouse" coverage to the single or "EE" coverage, whereby the employee receives the opt "down" allowance $ALLOW_4$. The fifth move permits the employee to opt "out" from the "EE+spouse" coverage, whereby the employee receives the allowance $ALLOW_5$. The sixth move permits the employee to opt out from the single coverage "EE", whereby the employee receives the allowance $ALLOW_6$. Whether the sixth move is available to the employee may depend upon the source of the medical coverage, i.e., the product provider might mandate that a single employee must be covered by a medical coverage and prohibit this opt "out".

On the other hand if the employer elects in step 156 not to set the amounts of the allowances $ALLOW_1$–$ALLOW_6$, step 160 inserts the $ALLOW_t$ to $ALLOW_6$ variables into the linear equations to be solved by the linear programming. In step 160, in order to make the linear program calculation of the values of $ALLOW_1$ to $ALLOW_6$ practical, it may be desirable to break down each of the six moves described above into incremental steps. As an example of such steps, each opt "down" and/or "out" move may include one or more incremental steps from the coverage of one class to that of the next lower class; such a step is represented by the variable $ALLOW_t$. A full opt "out" step from single coverage may be represented by the variable $ALLOW_o$. A broad range of other options exists.

Then in step 162, based on the employer's estimate of employee or an actual census of the opt "down" and "out" steps, a calculation is made of the opt "down" and "out" allowances generated. If step 158 was applied, then this is the total dollar amount of such allowances. If step 160 is applied and the $ALLOW_o$ and $ALLOW_t$ variables used, then the result of step 162 will be a constant times the $ALLOW_o$ variable plus another constant times the $ALLOW_t$; in that situation, the values of $ALLOW_o$ and $ALLOW_t$ will be solved for by the linear program.

Quantitatively, step 162 determines the total cost savings to the employer resulting from the employer's election in steps 158 or 160, and from the "downs" and "outs" allowances $ALLOW_1$–$ALLOW_6$, which were set by the employee in step 120 of FIG. 2A, in accordance with the following equation:

$$\sum_{j=1}^{6} ALLOW_j m_j = \alpha_c \quad (1)$$

where each of $m_j$ is the number of employees who have actually made or are estimated to have opted "down" and/or "out", and $ALLOW_j$ is the allowance for a particular one of the six illustrative moves j. Equation (1) first sums the costs for all of the opting employees $m_j$ for one of the moves, and then repeats the summation of for each of the potential j moves where j=1 to 6. Step 160 uses the linear programming to solve for the values of $ALLOW_o$ and $ALLOW_t$. The total contribution for each of the moves "j" is represented by a particular number of the variables $ALLOW_t$ and a particular number of the variables $ALLOW_c$. For example, the amount of the allowance $ALLOW_3$ for an employee opting to opt out from the family coverage would be represented by $2 ALLOW_t + ALLOW_o$, i.e., one $ALLOW_t$ for the move from the family coverage to the employee plus children coverage, another $ALLOW_t$ for the move from the employee plus children coverage to the employee coverage and one $ALLOW_o$ for opting out from the employee coverage. The other moves may be similarly expressed. In this embodiment, equation (1) sums all of the allowances $ALLOW_o$ and $ALLOW_t$ for all of the moves made by all of the employees; for example, the output of equation (1) might appear as 30 $ALLOW_t$ plus 10 $ALLOW_o$. The use of $ALLOW_o$ and $ALLOW_o$ is a good illustration of reducing the number of independent variables and thus producing useful linear programming solutions.

Next in step 164, $n'_{Ai}$ is defined for each of the classes i=1 to "s", as the number of employees in that class after those who have opted "down" or "out" for the benefit product A, i.e. medical insurance, have been deducted. As $n'_{Ai}$ is the estimated number choosing a class, this is used subsequently for various costing purposes.

Then step 166 permits the employer to elect to give or not to give its employees allowances for opting from a set of "outs" or "downs" in another benefit product B, e.g., a dental health plan, in the manner of steps 158 and 160 described above and to accumulate the costs for all of the sets of "downs" and "outs" for product B. It is appreciated that steps 158, 160 and 162 are repeated for each product or benefit of the flexible plan which provides for opting "down" or "out".

Next in step 170, a decision is required by the employer as to whether there is to be a relationship of the excess amounts $EXTRA_i$ provided by the employer to each of the "s" classes for purchase of flexible benefits other than just ranking; in other words, are the relationships between the excess amounts for coverage purchases in different classes to be explicitly provided. If the answer is that the subsidiary relationships are to be explicitly provided between two classes i and j, then the excess amount relationships are defined.

As will be explained below, the employer makes a variety of monetary contributions to its employees, who in turn use these contributions to purchase benefit products as selected by each employee. The employer's principle contribution takes the form of a flexible credit $FC_i$, which is defined as that fixed monetary amount for each employee of the "i" class of employees, where "i" varies from 1 to "s" and "s" is the number of classes. It is understood that there may other contributions made by the employer to its employees as will be explained below. In turn, the excess amount $EXTRA_i$ is defined as the excess amount of the flexible credits $FC_i$ which the employer provides to its employees in class "i" over the purchase price of the products A', B', C' . . . E' of the new, flexible plan, that match or most nearly match products A, B, C . . . E of the employer's current, fixed benefit plan, plus any contribution that the employee now makes to that current, fixed benefit plan. Step 172 designates that relationship as expressed in equation (2). It should be noted that if the employer desires that the excess amount be equal for all participants, then for all of the relationships between adjacent classes, there is just a single flexible credit FC and a single excess amount EXTRA. In an instance in which the flexible credit FC is fixed, it may be better for the employer to establish the value of the flexible credit FC directly, since it pertains to the impression of the plan to employees and not to fulfillment of economic objectives. On the other hand, if excess amounts EXTRA are to be provided to different classes, but nothing other than an ordered ranking is specified, then step 174 applies. For all adjacent classes i, j in such an ordered ranking, it is merely noted that $EXTRA_i > EXTRA_j$, where i is the class desired to receive the higher excess amount and j the class desired to receive the less excess amount. Alternatively at the election of the employer, a special or particular relationship can be established in step 172 between the excess amounts $EXTRA_i$ and $EXTRA_j$ for any classes i and j. For example, the relationship may be defined by a constant $K_{ij}$ in accordance with the following formula:

$$EXTRA_i = K_{ij} EXTRA_j \quad (2)$$

where $EXTRA_i$ is the excess amount to the employees in class i, and $EXTRA_j$ is the excess amount in a different class j, and the constant $K_{ij}$ defines the relationship between the excess amounts of classes i and j of employees. Any relationship other than the multiplicative one of (2) is of course possible.

Next as shown in FIG. 3B, the process for permitting the employer to establish its priorities as to the structure and cost of the flexible plan, continues in step 176. The employer enters in step 178 a dollar amount, which the employer sets as a "target" for the cost savings realized by adoption of the new flexible plan over the cost of the old fixed plan. This savings target for the new flexible plan is identified as the variable $TARGET_T$ and will be included in a set of linear equations, which are explained below.

In the contemplated flexible plan, the employer provides a further monetary contribution or flexible credit which is identified as the variable FC. The variable FC is that monetary contribution given to each employee. The costs to the employees of the various benefits or products A', B' . . . E', F . . . J, K . . . M for each employee are then charged against that flexible credit FC. In addition to the flexible credit FC, the employer makes the following further contributions to each employee in the form of: a) the allowances ALLOW, discussed above, for the opt "downs" and/or "outs" which the employee may elect in step 120, b) the payments to provide incentives or, at least, to partially compensate for undesired class disparities of the present plan, herein both termed subsidies, to the employees who participate in the benefit products of the new flexible plan A', B' . . . E' which were selected by the employer in step 140 and match similar products included in the present, fixed plan and other new products which were chosen by employer in step 142 to be added to the new, flexible plan F, G, . . . I, and c) for the benefit products J, K . . . M of the new, flexible plan, which were added by the employer as described in step 138. In most instances those mandated products are paid for directly by the employer and do not affect any shortfall or excess of spending by the employee related to the flexible credits FC.

In accordance with this invention, the flexible credits FC may illustratively be a set dollar amount that is given to each employee, or alternatively may vary for each benefit product A, B, etc. and/or for each class of employees. In the example described above, the employees were placed in four classes according to being single, employee+spouse (married), employee+children and family. It is appreciated that defining the variable flexible credit FC for each of the plurality of classes and/or product adds a corresponding variable for solution to the process for setting the benefit funding, the use of which additional variables needs to be justified by the particular needs of the employer. In the illustrative embodiment shown in FIG. 3B, the employer may simplify the process by setting in step 180 the variable flexible credit FC to be a fixed constant, i.e., a fixed dollar amount will be given to each employee regardless of the class of the employee and against which all benefit products will be charged. If step 180 fixed the variable flexible credit FC, then step 182 enters a particular dollar amount for the constant flexible credit FC. However if in step 180 the employer decided not to fix the flexible credit FC, step 184 does not fix the value of the flexible credit FC, but moves to step 186 where as will be explained, a linear equation is established with at least one variable corresponding to the flexible credit FC.

Next in step 186, a set of relationships are constructed to represent certain financial aspects of the new flexible benefit plan. For example in an illustrative embodiment of this invention, these relationships take the form of the previously discussed set of linear equations, each of which includes variables to define particular financial feature(s) and is used to measure amounts exceeded, or shortfalls of a target set by the employer to constrain that financial feature(s). With regard to shortfalls, each of those is defined as a variable. In particular, step 185 constructs a plurality of linear equations, which constrain, i.e., define, the financial aspects of the new flexible plan of benefits. Prior to this step, the variables have been defined in terms of the various financial aspects of the new plan. Now in an illustrative embodiment of this invention, step 185 selectively incorporates selected of those variables into each of the linear equations (2) and (4)–(11) as discussed herein. As will be discussed below, step 186 selectively incorporates variables used in the linear equations (2) and (4)–(11) into the objective row (3). These variables are selected based on the particular goals of a given employer.

It is in the nature of the structuring of the relationships that prevail here that the number of linearly independent equations is less than the number of linearly independent variables included within these linear equations. For that reason, the power of linear programming becomes apparent by the use of the objective row. The objective row, unlike the remaining linear equations which define constraints, includes a set of coefficients which when multiplied times the respective variables defines a corresponding objective or goal, or multiple objectives or goals, of the employer. Typically, some of the employer's goals or objectives conflict with other goals, and all can not be met with the constraints incorporated into the linear equations. Even if there is not a feasible solution of the set of linear equations that meets all of the employer's targets, these equations may be solved by a linear program to rank the failures to meet each of those targets in an objective (maximizing) row so that the solution satisfies the most critical goal first, the second most critical goal second, and so forth. This feature of ranking the significance of any failure to meet a particular target allows solutions to be examined by the employer in terms of the employer's priorities rather than to treat all such failures on an equal basis, as would be the case if the linear program indicated that a solution meeting all targets was simply impossible.

It is not unusual for the employer to set goals that can not all be met simultaneously. For example, the employer may wish to reduce its costs for its new plan of flexible benefits, while the employees retain as good benefits as before at no added costs to the employees. It is apparent that, barring any cost savings potential in the plan, these goals conflict with each other and, if incorporated into an objective row, may lead to an infeasible solution consistent with the linear constraints.

In this illustrative embodiment of this invention, the relationships are configured as linear equations or inequalities. A linear equation or inequality by definition includes only linear variables, i.e., there are no variables of a different order than 1, i.e., no $X^2$, $X^3$ etc. Depending upon the equations or inequalities, there may be no solution, and if there is a solution, there may be only one solution or an infinite number of solutions. A solution is deemed to be infeasible if there is no answer that meets all of the requirements.

In linear programming, the objective row can be constructed that applies a large negative coefficient M to be multiplied times each corresponding variable that one seeks to have eliminated and a positive coefficient times each of the variable desired to be retained. As a result, the sum of these coefficients times the corresponding variable is forced to become a maximum, subject to the equation or inequality constraints. For example, if there were four different goals of the client, each reflected by an independent variable, then there would be four variables defined to reflect the amount by which each such target was not met. The coefficients associated with the four variables may be represented by $M_1$, $M_2$, $M_3$ and $M_4$. If the coefficients $M_1 \gg M_2 \gg M_3 \gg M_4 \gg 1$ were numbers of extremely large magnitude relative to the values of such potential shortfall variables, then in the objective row one might assign $-M_1$ times the shortfall of the most important target, $-M_2$ times the shortfall of the second most important target, etc. If, subject to meeting all such targets, there were a variable defining the value of the flexible benefit plan to the employer or employee (or two such variables or weighted combination thereof), then that variable or variables would be entered with a positive coefficient or coefficients, equal to the relative weighting of two or more such objectives, in the objective row.

This approach provides the employer an effective mechanism to structure a flexible benefit financial plan to meet its ranked goals from the most to the least important. The employer can easily set and reset, as explained below, these coefficients in accordance with changing priorities to adjust thereby the mix of benefit products and costs thereof, until a plan is developed which meets all of the employer's goals or at least presents a plan which best addresses, in the employer's view, the conflicting goals and priorities of the employer. The contemplated set of linear equations or inequalities may be solved by commercially available linear programming software. Among other options that may be utilized of that software, a solution may be stored and applied to a subsequent revised objective function to determine the value of the earlier solution under the subsequent objective row.

Another feature of linear programming employed by this invention is the display of shadow prices. This mechanism allows the user to see what the impact on the objective row is, if a constraining linear equation or variable thereof were incrementally changed. Thus, for example, if one of the targets was that the benefit amount contributed by the employer to an employee with family should not exceed the contribution to a single employee by a certain amount, and if a failure to meet that target amount proved to be the most adverse outcome of an optimum linear programming solution, then the effect on that solution of easing the constraint by one unit would be provided.

The employer's priorities for structuring the new, flexible plan may be ranked. To effect such ranking, selected of the goals is reflected as explained above as a target variable to be included in the objective row which reflects the failure to meet that goal. As explained above, each target variable has a corresponding one of the coefficients $M_I$ to $M_x$. Illustratively, variables can be defined as: a) the cost increase for the employer of the new, flexible plan over the old, fixed plan; b) the reduction in employee benefit purchasing power in the new versus the old, fixed plan; c) the excess cost of the new plan over the employer's cost cutting objectives; and d) the disparity between an employee's benefit cost to the employer in the most richly benefitted class versus an employee's cost in the least richly benefitted class.

As illustrated in FIG. 3B, one goal of the employer may be to prevent the total cost of the new, flexible plan from exceeding that of the old, fixed plan. The corresponding variable could be expressed as the $ADD_T$, which would be defined as the added cost of the new, flexible plan over the old, fixed plan. A corollary goal could also be expressed by a different objective variable $SAVE_T$, which is oppositely defined as the savings in total cost resulting from the adoption of the new, flexible plan over the old, fixed plan. In step 178, the employer enters the amount of the variable $SAVE_T$ which defines the employer's target savings of the new, flexible plan over the old fixed. A second variable $MISS_T$ may then be defined as the shortfall of meeting the savings target variable $SAVE_T$.

A third goal may be defined to reflect the shortfall $REDEMP_T$ as the sum of the shortfalls of each of the "s" classes that the flexible credits $FC_i$ and subsidies $ER_i$ for all products as contributed by the employer for the new plan of flexible benefits, fails to match that sum for the old, fixed benefit plan. In any given class, this shortfall per employee is multiplied times the number of employees in that class. The sum of these shortfalls is defined as the variable $REDEMP_T$.

A fourth goal may be defined to reflect the failure to keep the differential in the value of benefit products given to one class "i" of employees as compared to another class "j" below a prescribed value. Illustratively if the employer wanted benefit values over all classes to be equal, an objective variable $DISP_{MAX}$ could be defined as the greatest difference in the employer contributions, i.e, subsidies and flexible credits FC, to one class and the total of such contributions to another class.

A fifth goal may be to maximize the total added value of the new benefits plan with respect to that provided by the old, fixed plan. Such an objective variable could be represented as $ADDEMP_T$.

After the linear relationships (2) and (4)–(11) are constructed in step 185, selected of the variables as appear in the above noted linear equations are incorporated into the objective row (3) as set out below. The employer initially selects a set of the variables in step 186 based on a corresponding set of goals. Above there are illustratively enumerated 5 goals, one for each of the variables to be incorporated into the objective row (3). Significantly, these goals are selected by the employer as, at least in the first instance, the goals for the employer's plan of flexible benefits. As will be explained below, the employer can change these variables in step 198 to reflect new and different goals, if the solutions of these rows (2)–(11) as obtained in step 198 do not satisfy the employer.

In an illustrative embodiment of this invention, the objective row is composed of the above discussed objective variables as follows:

$$-M_1 \times ADD_T - M_2 \times REDEMP_T - \qquad (3)$$
$$M_3 \times MISS_T - M_4 \times DISP_{MAX} + ADDEMP_T$$

The objective row (3) does not include an equal sign, because it is the object of this process to maximize the sum of the variables of this row (3). Alternatively, the output of the objective row (3) could be minimized if the negative coefficients –M were replaced with positive coefficients +M. In the above described illustrative embodiment, it is desired to maximize the sum of the objective row as shown in equation (3). The use of linear programming permits the inclusion of the coefficients "M" into the objective row to reflect the priorities of the employer. In the process of this invention, the employer is able to prioritize the objective variables included in the row (3) in any desired order by the use of the negative coefficients M. Each of these negative coefficients M is associated with its selected objective variable to prioritize that objective variable. The lower or more negative a coefficient M is, the higher the employer's priority. In an illustrative embodiment, the value of the coefficients M are set such that the top priority objective is fully satisfied, before the second priority objective; no subordinate objective is partially or fully satisfied in preference to a higher ranking objective. Alternatively, weighted objectives can be reflected in an objective row through the use of appropriately assigned coefficients.

In row (3) above, the highest priority is illustratively awarded by the employer to prevent the cost of the new, flexible plan from exceeding that of the old fixed plan, which is expressed as $ADD_T$ and is associated with the negative coefficient $M_1$. The second highest priority is awarded to any decrease $REDEMP_T$ in the value of the benefits of the proposed new plan from that of the present plan of fixed benefits and is associated with the negative coefficient $M_2$. The third highest priority is awarded to the shortfall $MISS_T$ of meeting the savings target of the new flexible benefit plan. The fourth highest priority of the objectives of row (3) is the disparity $DISP_{MAX}$ between benefits provided the most richly rewarded and least richly rewarded classes. Finally, the lowest priority of the objectives is the total increase or value added to the cost or value of the benefit products $ADDEMP_T$ included in the new flexible plan over the value of the products of the old, fixed plan and is associated with the positive coefficient 1.

Thus in accordance with the teachings of this invention, the employer will be permitted as described below in detail to change priorities and, in particular, to alter priorities by at least selectively changing the order or the negative coefficients applied to each of the objective variables. It is also contemplated, as explained below, that the illustrative objective variable included within the row (3) may be varied. For example, selected of the objective variables could be deleted and/or new variables as indicative of certain other objectives to be achieved by the new flexible plan included. For example, the objective variable $SAVE_T$ as defined above could be added to row (3) with a positive coefficient, if an employer wanted more savings beyond the desired target $TARGET_T$. Further, the employer may wish to impose a different penalty on the variable $SHORT_i$ in each class i, i.e., the amount by which an employee must pay more for benefits than before, if indeed variable REDEMP can not be eliminated in the optimal solution; doing so can skew such shortfalls in or against the direction of one class or another. These are simply illustrative and are not meant to be all-inclusive of the possible variations in an objective row (3).

It is also of course possible to vary some of the variables based on the result of a linear programming analysis. If, for example, the amount by which savings missed the target $MISS_T$ in (3) were relatively small, the employer might not be insistent on an exact satisfaction of his savings target and be willing to reduce that target by amount of the variable $MISS_T$ in the on-going analysis. In fact, a key attraction of this approach is the ability to be iterative in arriving at a solution satisfactory to the employer. Criteria originally given may be changed by the employer as the results become apparent in the course of reviewing the results of the linear programming.

An illustrative set of linear equations or rows are structured in accordance with the teachings of this invention. In the following, a set of linear equations will be structured. For each class i from 1 to "s", a linear equation may be expressed as:

$$FC_i - EE_{Ai} - EE_{Bi} - \ldots - E_{Ei} - EXTRA_i + SHORT_i = 0, \quad (4)$$

where the variables of the equation will now be defined. The flexible contribution FC is defined above as that monetary contribution made by the employer to offset fully or partially the cost of the new, flexible benefit plan and may be either a fixed amount or a variable one to be solved. In step 180 above, the employer sets the flexible contribution FC as either a fixed constant or a variable to be solved with the set of linear relationships. For the purpose of illustration, $FC_i$ is defined as that fixed monetary amount for each of the "s" classes "i" of employees, where "s" equals four, i.e., there are four classes of employees. Thus, there would be four equations, one for each class, similar to that of equation (4). The variable $EE_{Ai}$ is the amount which an employee in class "i" must pay for the benefit product A, after the employer has contributed its allowance and/or subsidy contribution to the employees, if any, that would reduce the employee's cost to purchase that benefit. Note that there are similar variables for each of products B', C' . . . E' of class "i". $EXTRA_i$ is the excess amount by which the flexible credits $FC_i$, provided by the employer to buy the benefit products A', B', C' . . . E' of the new, flexible plan in class "i", exceeds the employer's contribution that is required to buy the corresponding or most nearly corresponding benefit products A, B, C . . . E in the employer's current, fixed benefit plan, after any employee contributions to that fixed plan have been made. $SHORT_i$ is the amount of the shortfall which each employee in class "i" must pay for the new, flexible plan if wishing to obtain such benefits A', B', C', . . . E'. Thus in words, equation (4) means that the employer's flexible credits FC to its employees in a particular class less the amount $EE_{Ai}$ an employee in that class pays for the health insurance product A' less the amount $EE_{Bi}$ the employee in that class pays for a dental insurance product B' less the amount $EE_{Ci}$ that an employee in that class pays for any other benefit products C' etc. less the extra amount $EXTRA_i$ an employee in that class pays if buying all of these previously mentioned benefit products A', B', C' etc. plus the amount $SHORT_i$ the employee in that class must make up if buying all of these previously mentioned products in the new flexible plan, must equal zero.

A second set of "s" linear equations may be expressed for each of the classes i of each of the products A', B' . . . E' as:

$$EE_{Ai} + ER_{Ai} - A_i = 0, \quad (5)$$

where benefit products A' for example is the core health plan, $EE_{Ai}$ is as described above the cost which an employee in class "i" is charged for benefit product A', $ER_{Ai}$ is defined as the employer's subsidy in class i for the product A', and $A_i$ is the cost of the benefit product A' in class i to be paid to its provider. Since there are four classes in this example, there would be four equations for the benefit product A and four similar equations for each of the other products B, C, etc. Verbally, each of the equations modeled after equation (5) means that what an employee is charged for a particular product A', B', C' etc. plus what the employer contributes for a particular product less the cost of that product equals a zero.

The following linear equation defines the total cost of the new flexible plan to the employer as:

$$COST_T - \sum n'_i FC_i - \sum_{\substack{PRODUCT\,i=1 \\ A', B', ect.}} n'_{PRODUCTi} ER_{PRODUCTi} - \quad (6)$$

$$All\alpha_c - \beta_c - J_c - K_c - \ldots - M_c = 0,$$

where $COST_T$ is the total cost paid by the employer for all of the benefit products of the new, flexible plan, "N" is the total number of employees, $n'_i$ is the number of employees in class after the number of employees which opted down or out have been deducted, flexible credit $FC_i$ is the monetary contribution made by the employer for each employee in class$_i$, n'PRODUCT$_i$ is the number of employees in a particular class "i" as related to particular product after deducting therefrom the number of employees which have opted "down" and/or "out", $ER_{PRODUCTi}$ is the employer subsidy for the cost of a particular benefit product A', B', C' etc. for each of the "s" classes "i" (4 for example), $\beta$' is, as explained above, the expected total cost of all "participation cost reductions" contributed by the employer to induce employees to take a particular product or set of products, (e.g., for such instances in which a minimum participation is required), "ALL $\alpha_c$" is the sum of all of the allowances given to the employees for opting "down" and/or "out", and the costs of the new mandated benefit products J, K, M etc. for the new flexible plan are respectively represented as $J_c$, $K_c$, $M_c$ etc. In words, equation (6) means that the total cost "$COST_T$" less the sum of all employee flexible credits for each class and product, less the sum over all of the products A', B', C' etc. and of the classes "i" of the product of the number of employees "$n_i$ after those opting "out" and/or "down" and the employer contribution $ER_{PRODUCTi}$ for a particular product in a particular class. less inducement subsidies, less the sum of all of the allowances given by the employer for the opt "outs" and/or "downs" taken by the employees, less the costs paid for by the employer for the mandated products J, K, etc., equal zero.

The following linear equation showing the relationship of the costs for the new, flexible benefit plan and the old, fixed plan may be expressed as follows:

$$COST_T + SAVE_T - ADD_T - OLD_T = 0, \quad (7)$$

where $COST_T$ is defined above, $SAVE_T$ is the savings to the employer between the current, total employer cost of the new, flexible benefit plan over the total employer cost of the old, fixed plan, $ADD_T$ is the total added cost of the new, flexible benefit plan over the total employer cost of the old, fixed plan, and $OLD_T$ is the total cost to the employer of the old fixed plan. In words, equation (7) means the total employer cost $COST_T$ for the flexible plan, plus the total cost savings $SAVE_T$ to the employer for the total cost of the new, flexible plan over the old fixed plan, less the total added cost $ADD_T$ of the new, flexible plan to the employer over the present, fixed plan, less the total cost $OLD_T$ to the employer of the present, fixed plan equals zero.

The following linear equation defines the employer savings $SAVE_T$ for the new flexible plan over the old fixed plan as follows:

$$SAVE_T - TARGET_T + MISS_T \geq 0, \quad (8)$$

where $SAVE_T$ is defined above, $TARGET_T$ is the target set by the employer in step 178 for the employer's savings in the total cost of the new flexible plan over that cost of the present, fixed plan, and $MISS_T$ is the amount that the total cost of the new, flexible plan missed or exceeded that total cost of the old, fixed plan. Equation (8) means that the amount of the employer's savings $SAVE_T$, less the employer's target savings $TARGET_T$, plus the amount $MISS_T$ that the targeted savings fell below the actual savings will be greater than or equal to zero. Since the variable $MISS_T$ is a measure of how much the employer has failed to meet its goal, it is included in the objective row (3) where the amount $MISS_T$ is minimized in accordance with the priorities set by the employer. If the amount saved by the employer $SAVE_T$ exceeds the employer's targeted savings $TARGET_T$, then the inequality will hold, and the amount by which the actual savings falls below the targeted savings $MISS_T$ becomes 0.

The following linear equation determines $DISP_{MAX}$ as follows:

$$DISP_{MAX} - \underset{i \text{ over } S}{GREATEST}\left(FC_i + \sum_{PRODUCTS} ER_{PRODUCTi}\right) - \underset{j \text{ over } S}{LEAST}\left(FC_j + \sum_{PRODUCTS} ER_{PRODUCTj}\right) = 0 \quad (9)$$

The variable $DISP_{MAX}$ is defined above as the dollar disparity between the class$_i$ with the greatest sum of $FC_i$ plus employer subsidies and the class with the least sum of $FC_i$ plus employer subsidies. In an illustrative embodiment of this invention this variable $DISP_{MAX}$ may be included within the objective row (3) with a penalty coefficient M assigned to that variable. It is also appreciated alternatively, that an employer may want to assign disparities between classes, or to make disparities between successive classes equal. As defined above, $ER_{PRODUCTi}$ is the employer subsidy for one of the products A', B', C' etc. for a particular class "i". Verbally expressed, equation (9) means that the greatest disparity $DISP_{MAX}$ less the sum of the employer costs for subsidies and flexible credits for all products $ER_{PRODUCTi}$ for the most richly benefitted class, less the sum of the employer cost for subsidies and allowances for all products for the least richly benefitted class, equals zero. If there were a single flexible credit FC for all employees, then the disparity $DISP_{MAX}$ simply becomes the difference in the sums of the subsidies of the most richly benefitted and the least richly benefitted classes.

The following linear equation determines as follows the variable $REDEMP_T$ which is defined above as the total reduction in the coverage provided by the new flexible plan over all of the classes:

$$\sum_{i=1}^{s} n'_i SHORT_i - REDEMP_T = 0, \quad (10)$$

where $SHORT_i$ is defined above as the deficiencies in one of the "s" classes "i" which an employee must pay for the benefit products of the new, flexible plan over that which the employee paid for the products of the old, fixed plan. In words, equation (10) means that the sum for all of the 's" classes "i" of the product of the deficiencies $SHORT_i$ which the employees must pay and the number "$n_i$, of employees in a class after opting down or out, less the total reduction in employee benefits $REDEMP_T$ equals zero. As indicated above the variable $REDEMP_T$ may be included within the objective row (3) and assigned a penalty coefficient.

The eighth linear equation determines as follows the variable $ADDEMP_T$ which is defined as the added value of the new flexible program over that of the old fixed plan:

$$ADDEMP_T = \sum_{i=1}^{s} n'_i EXTRA_i - \sum_{i=1}^{s} n'_i SHORT_i + All\alpha_c + \beta_C + Jc + \quad (11)$$
$$Kc + \ldots + M_c + COSTRED + \sum_{\substack{PRODUCTS \\ A', B', \ldots E'}} \sum_{i=1}^{s} (n'_i - n_i) \times EE_{PRODUCTi}$$

In words, the total added value $ADDEMP_T$ to the employees of the coverage of the new flexible plan equals the sum over each of the "s" classes "i" of the product of the amount $EXTRA_i$ that the employer allowed extra for spending in excess of that amount for the current fixed plan and the number $n_i'$ of employees in a particular class "i" after the number of employees which have elected to opt "out" or "down" have been subtracted, less a similar sum over each of the "s" classes "i" of the product of the shortfall $SHORT_i$ in the flexible credits FC provided for the employees over the costs to the employees for the new products corresponding to the products of the present fixed plan, plus the sum $\alpha_c$ of all of the allowances which the employer has allowed for all of the opt "downs" and/or "outs" elected by the employees, plus the estimated sum of all employer furnished subsidies and participation cost reductions that encouraged employees to choose particular products, plus the sum of the added value of the new mandated benefit products J, K . . . M which are paid for by the employer (without effecting the opt down/out allowances further provided to the employees), plus COSTRED, which can be any other benefit not recognized elsewhere (e.g., a cost savings in mandated versus voluntary long term disability, or an incentive not available before to the employees in their 401(k), plus the sum over all of the products A', B' . . . E', which are elected in steps 140 and 142 to receive credits for opt downs/outs and over all of the "s" classes of the product of the difference between the number of employees n'$_i$ participating in the old, fixed plan and the number of employees n$_i$ participating in the new, flexible plan (with the number of opting employees deducted) and the employee costs $EE_{PRODUCTi}$ for the elected benefit products. As shown above, the variable ADDEMPT$_T$ is added to the objective row (3) and a priority coefficient of +1 is associated therewith in the objective row; in this illustrative embodiment, maximizing quantifiable benefits to the employees is the key goal once employer prioritized goals are fulfilled to the greatest extent possible. Clearly other objectives are possible, at the discretion of the employer.

Figure 4:
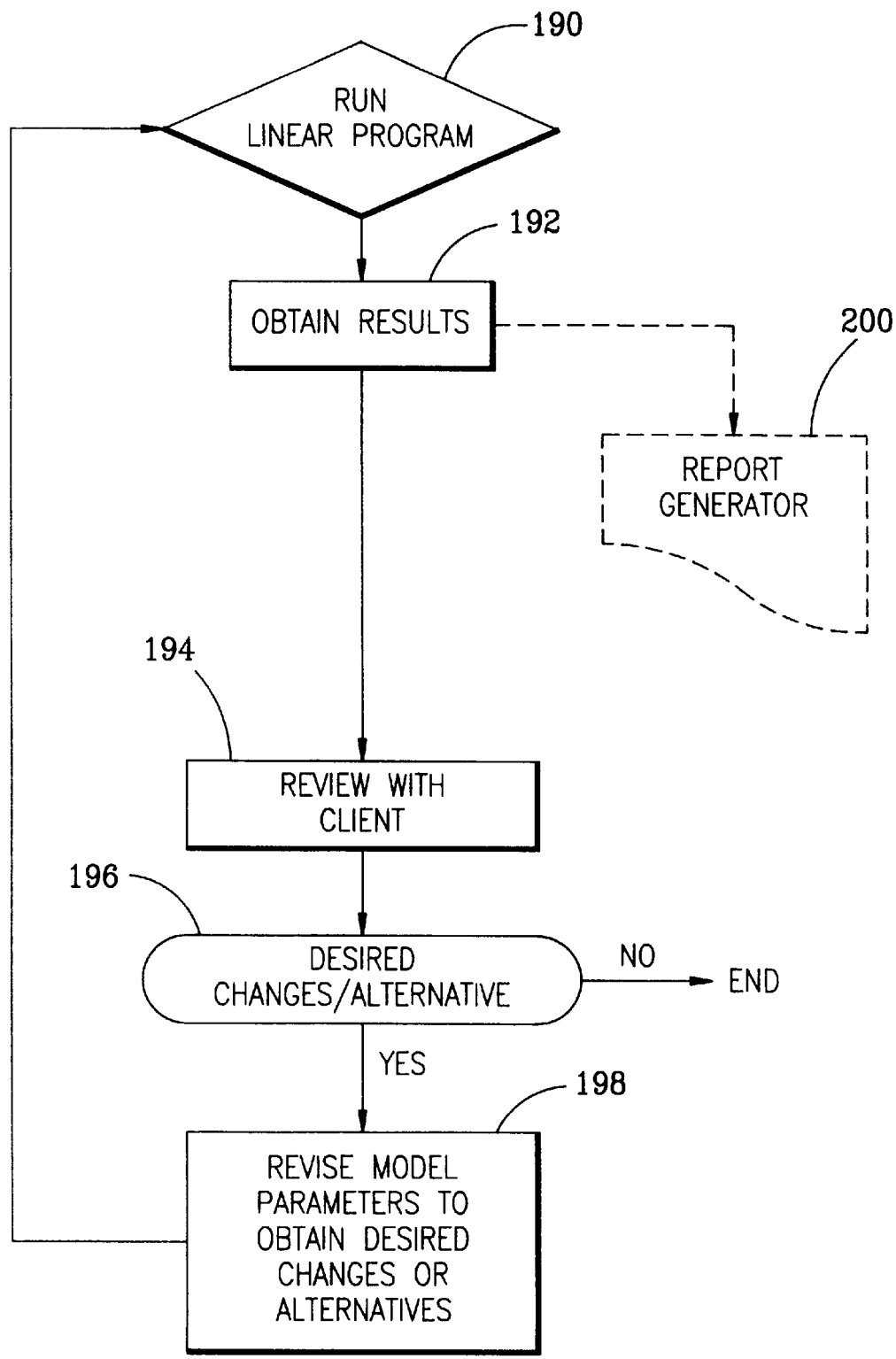
FIG. 4 is a flow diagram of the linear program executed by the computer shown in FIG. 1 to test the priorities and constraints structured by the program of FIG. 3A and B, to review the resultant plans and, if necessary, to input through the operator changes desired by the employer to the previously selected constraints and priorities.

As the linear equations or relationships (4)–(11) and objective row (3) are formulated as described above, they are stored in file 20B of the memory 20. After these equations have been structured, step 190 as shown in FIG. 4 solves these equations and inequalities using linear programming to determine the maximum valve of the objective row, subject to the constraints of these eight illustrative types of linear equations or groups of linear equations. Illustratively, there are a number of available software products, which will solve the linear equations (4)–(11) and maximize (or minimize) the output of the objective row (3). For example, commercially available programs, which will solve the above equations (3)–(11), include MPL™, GAMS™, OMNI™ and many more programs. One of the aforementioned linear programs may be downloaded into file 20D of the memory 20. For example in the embodiment where the output of the objective row is maximized, the corresponding values for the other variables of the equations (3)–(11) define the costs of and other relationships in the benefit financial plan and determine the details of that plan, e.g. cost, whereby the employer may review that plan and determine whether this particular financial plan satisfies the employer's priorities and goals.

Though in the illustrative embodiment described herein the relationships are expressed in terms of the objective row (3) and the linear equations (4)–(11), it would be appreciated by one skilled in this technology that other constructs which may be employed to express these relationships. Similarly, one skilled in this art could employ other mathematical techniques for solving the relationships as described above in a manner that would optimize the values of the variables and/or to prioritize which variables as included within these equations are deemed to be the most important in constructing a particular benefit plan with the desired financial aspects. In this regard, it is appreciated that the computer as shown in FIG. 1 is particularly adapted to be programmed with different software to solve optimally these relations and to repeatedly provide solutions which reflect different priorities of the employer.

Each of the above noted linear programming software packages is capable of solving the rows (2)–(11) to provide values of the variables for each of the available solution or solutions, assuming that a solution is feasible. Typically, this solving software provides a set of values for the variables explained above; in particular, the printer 16 and/or the CRT 14 provide a display of these values for the employer's review. For example, the monetary amounts of the following variables are displayed in a format useful to the employer: EE$_{Xi}$—the amount an employee in class i must pay for product X; ER$_{Xi}$—the amount the employer must underwrite for product X in class i; X$_i$—the total of EE$_{Xi}$ and ER$_{Xi}$; EXTRA$_i$—the amount the employer allows for extra spending for the new plan of flexible benefits over that paid for the present plan of fixed benefits; SHORT$_i$—the amount of the shortfall the employee in class i must pay for base benefits; ADD$_T$—the added cost to the employer for the new plan; DISP$_{MAX}$—the largest disparity in monetary units between that class receiving the richest value of flexible benefits in the new plan and that class receiving the least rich value of flexible benefits, along with its variables in equation (9) and also the disparities between benefits for other pairs of classes; REDEMP$_T$—the total added value in monetary units of the new plan as compared to the present benefits; COST$_T$—the total cost for the employer of the new plan of flexible benefits along with its component variables in equation (6); TARGET$_T$—the targeted saving to the employer for the new plan of flexible benefits; MIST$_T$—the shortfall of the actual cost of new plan from TARGET$_T$; ADDEMP$_T$—the added value of the new plan over the old, along with its component variables in equation (11), many of which have already been indicated above; $\alpha_c$ the sum of the opt "down" and "out" allowances, along with component calculations; $\beta_c$ is the total of the participation cost reductions paid for by the employer to encourage employee participation in certain selected benefit products; ALLOW$_j$ and m$_j$, where j goes from 1 to "s"; and the other cost relationships shown in equation (8).

There are several different mechanisms, or algorithms, available by which a linear program may solve rows (2)–(11). In accordance with several such mechanisms, first an answer is sought whereby all of the constraint rows (2) and (4)–(11) are satisfied, regardless of impact on the objective row (3). Then, the values of certain variables are changed and the effect on the output of objective row (3) is observed. Once a feasible solution to the equation (2)–(11) and its solution envelope are found, then values dictated by that envelope are developed for the next solution of these equations. Similar successive solutions are made until no further improvement can be obtained. At that point, the above noted values for the last solution are the optimum values and are displayed for employer review.

As explained above, the values of the negative coefficients M are set to ensure that a solution or solutions are reached which will give priority to the various target variables employed in the objective row (3) in that hierarchical ordered determined by the magnitude of the coefficients, i.e., the greater the magnitude of the coefficients the higher the priority of the target variable to which a particular coefficient is assigned. As also noted above, the values of the coefficients M$_1$, M$_2$, M$_3$ and M$_4$ are selected such that a given coefficient is at least an order of magnitude greater than the next lower coefficient in the hierarchical order, e.g., M$_1$ is at least an order of magnitude greater than M$_2$.

Setting the magnitudes of the row coefficients is this manner ensures that the linear programming will drive the solution of the linear equations (2) and (4)–(11) in an orderly fashion which will establish hierarchial priority of the target variables of the objective row (3). The employer selected priority is achieved in the solution of these equations by eliminating preferentially the objective variable of the highest priority over the variables of lesser priority. In the illustrative embodiment of the objective row (3), the ADD$_T$ variable is selected to be the highest priority and is eliminated first. The most important priority to the employer in this illustrative embodiment is that the cost of the new plan of flexible benefits will not exceed that of the present fixed plan. It will be appreciated that this priority is met when the difference between the cost of the present plan less the cost of the new plan is greater than or equal to zero. Thus in the course of solving the rows (3) to (11), the ADD$_T$ variable, i.e., the variable of highest priority, is said to be eliminated when this variable is eliminated or, in other words, the cost difference represented by this variable is reduced to zero, i.e., the cost of the new plan becomes less than or equal to the cost of the present plan. The objective variables of a lesser priority, i.e., those objective variables associated with the negative coefficients $M_2$, $M_3$ and $M_4$ as included within the objective row (3), may be eliminated subordinate to the elimination of the variable of the highest priority.

Setting the values of consecutive negative coefficients M to differ from each other by at least an order of magnitude greater, seeks to ensure, if possible, that a variable in the objective row (3) of a greater priority may be eliminated before the linear programming eliminates any objective variable of a lesser priority. For example if the present coefficients $M_1$, $M_2$, $M_3$ and $M_4$ were replaced respectively by 4M, 3M, 2M and M, where M is a common, large number, the difference between consecutive coefficients may be less than an order of magnitude and the linear programming would seek to solve the set of rows (2) to (11) in a manner that the program calculates two or more variables reflecting undesired goals in relative proportion to each other, one variable to another. The outcome of processing an objective row with such coefficients was that a unit of the objective variable of the second highest priority was deemed to be 1.5 (3/2) times as valuable as a unit of the objective variable of the third highest priority. This was not a desired result. Rather, it was desired that the linear processing eliminate an objective variable of a high priority completely before the linear processing begins to process any objective variable of a lesser priority. The setting of the difference between consecutive negative coefficients M to be at least an order of magnitude ensures that the linear processing handles only one objective variable at a time, i.e., it operates to eliminate the remaining objective variable of the highest priority before processing a lower priority variable.

As noted above, linear programming is used to solve the set equations (2) and (4)–(11) in a manner to maximize the output of the function or objective row (3). It is appreciated that the equations (2) and (4)–(11) define a multi-dimensional space. Further, all of the feasible solutions of these equations lie within this space and that the optimal solution, i.e., that solution which will maximize the output of the objective row (3), lies on the envelope of that space. In a common procedure, the first step is to obtain any feasible solution of the equations (2) and (4)–(11). Next, a solution of these equations which lies on the envelope is sought. The remaining processing is to move along this envelope and to reiteratively place values of variables which will continue to maximize the objective row. The direction along the envelope is selected which continues to obtain in the present solution a larger value for the objective row (3) than that obtained in the previous solution. When it is no longer possible to increase the value of the objective row (3) by moving in any direction along the envelope, linear programming has produced the single optimal solution of the equations (2) and (4)–(11). When the optimal solution has thus been found, step 190 is complete and then step 192 displays the solved values for the variables resulting from the optimal solution for the employer's review.

It is expected that as linear programming drives the sequence of feasible solutions towards the optimal solution, that one or more of the variables associated with the negative coefficients in the objective row (3) may be reduced to zero as described above. It is not expected that all of the adverse variables in the objective row (3) will necessarily disappear when an optimal solution is found for the equations (2) and (4)–(11). Even so, linear programming and the use of the negative coefficients provide an effective mechanism to demonstrate the extent to which the various objective variables, often in direct to competition with each other, e.g., the variable $ADD_T$ as indicative of added cost to the employer for the new plan versus the variable $ADDEMP_T$ as indicative of the added value of the new plan to the employees, may be met.

In this illustrative embodiment when linear programming is used to solve the rows (2) to (11), the variable $DISP_{MAX}$ which indicates the maximum difference between the mostly richly benefitted class and the least richly benefitted class coverages may be reduced as desired, but the resulting employee payments $EE_{Ai}$ and $EE_{Aj}$ to be made respectively by the employees in the most and least richly benefitted class for product A might be out of balance. In the interest of fairness to different classes of employees, the employer may wish to maintain certain differences between certain variables, e.g., the costs of medical insurance to the family employee $EE_{Ai}$ and to the single employee $EE_{Aj}$. It is appreciated that the cost of family coverage of medical insurance is greater than corresponding single coverage and that the family employee should pay more than the single employee. To establish at least a minimal difference in payment $L_{ji}$ between the employees in the classes i and j for product A, the following equation may be added to the set of equations (2) and (4)–(11) discussed above to be solved:

$$EE_{Ai} - EE_{Aj} \geq L_{ji}, \tag{12}$$

where the employer can set the variable $L_{ji}$ to a particular dollar amount. Similarly, other constraints may be readily added to the above set of rows (2)–(11), when other concerns may appear.

Linear programming indicates whether a particular parameter is actually binding, by the absence of a "slack" in the objective row (3) of an optimum solution. If it is zero, the parameter can be binding. Consider for example that when variable $L_{ji}$ is set to be $300 or greater, the row including this parameter had a zero slack in the optimum solution. A non-zero shadow price and a slack of zero in equation (12) implies that to ease the constraint, that the variable $L_{ji}$ must be less than or equal to $300.00 and would cause an increase in the value of the objective row (3). Linear programming as described above can also indicate the largest number for the variable $L_{ji}$ that can be set without adversely effecting the solution of the objective row (3), through its reporting of ranges and shadow costs.

Still referring to FIG. 4, step 190 outputs a set or sets of the solutions of the variables and the objective variables which provide an optimum answer or a set of the best available values for the equations (2)–(11). In step 192, the set or sets of variable values are displayed on any of the well known displays such a CRT or television display. Similarly, these set or sets of variable values are transmitted in step 200 to a report generator, which prepares a report designed for the employer and/or the employees. Illustratively, a report for the employer would include:

(1) values for each of the target variables which the employer has specified (such as the four used illustratively in the objective row 3) in highest to lowest priority and whether the target has been met; if not, by how much it has been missed;

(2) the added value of the benefit package to the employees; and (3) the costs and values of all variables included here, arranged in sequence assessed to be of greatest to those of least interest to the employer, along with a verbal statement as to the meaning of each such particular variable.

Certain of the outcomes discussed in the third paragraph above (and in the first paragraph as well, depending if (1)

were to have some class specific objectives) would often be displayed by classes side by side, so the employer could assess the degree of satisfaction within and across classes of its priorities.

The previously mentioned, and other, linear programming software products include variously (a) report writers associated with them or the (b) capability of generating a file to be read by a data base system such as Access™ or a spreadsheet system such as Excel™ that in turn can be used as a report writer. There are also a number of report writer software systems that can be linked to a wide range of file sources. Such a report generator program is retained in file 20C of the memory 20. The objective of taking the numerical data and converting it into narrative with or without graphs or charts can be achieved by any of those approaches.

Next in step 194, the report provided by the report generation step 200 is reviewed by the employer to determine whether this plan best meets the employer's objectives. If the employer is satisfied with the flexible benefit plan reported in step 200, the employer enters in step 196 an input indicating that the employer does not wish to change the program and the processing described above is terminated. On the other hand if the employer is not satisfied with the last report generated in step 200, it so elects in step 196 and continues to step 198 wherein the employer initiates the desired changes to its flexible benefit program. Generally, step 198 permits the employer to change its priorities, the amount of the target parameter values, constraints and/or add new constraints in the form of linear equations with the present or new variables. One of these possible approaches is to change the value assigned to a particular penalty coefficient to reflect the reordered priorities assigned to the employer's flexible benefit plan and, in particular, to the related coefficient in the objective row or constraint in one of the equations or groups of equations. For example if after reviewing the printout of the last generated flexible plan, the employer might upgrade the priority of leveling the employee flexible credits FC or the employer's subsidies and/or allowances to each of the classes of its employees. The leveling goal is represented by the objective variable $DISP_{MAX}$. Also, the employer may wish to downgrade or upgrade its goal of achieving a specified savings in the cost of the new, flexible plan with respect to the old, fixed plan. The cost savings goal is represented as explained above by the objective variable $MISS_T$. According to this invention, these goals may be reprioritized by changing the hierarchy of the negative coefficients $M_I$ to $M_X$ in the objective row (3). For example, the negative coefficient related to the objective variable $DISP_{max}$ is changed from $M_4$ to $M_3$, and the negative coefficient related to the objective variable $MISS_T$ is changed from $M_3$ to $M_4$ as they would now appear in the objective row (3). Steps 190–200 may be repeated with a different sets of goals and/or revised targets until one or more satisfactory flexible plans are generated.

Priorities may be changed in another way. New measures or objective variables may introduced in the objective row (3) in accordance with the teaching of this invention. For example, although the variable DISPmL was used in equation (9) and in the objective row (3) as earlier described to minimize the difference between the greatest and the least richly rewarded class (as reflected by the sum of ALLOW plus $\Sigma\ ER_j$), certain employer objectives may not be met by the use of this variable. A difference between one specific class and another specific class may be a greater concern than a difference in another paired combination. Accordingly, the variables $DISP_{ij}$ could be defined similar to that of equation (9) as follows:

$$DISP_{ij} = ALLOW_i + \sum_{PRODUCTS} ER_i - ALLOW_j - \sum_{PRODUCTS} ER_j \quad (13)$$

The new $DISP_{ij}$ would be inserted into the objective row (3) and assigned to a different penalty coefficient M in accordance with the relative priority of such differences.

In the above described embodiment, the variable $TARGET_T$ was defined as a target, i.e., the total savings to be realized by the employer adopting the new, flexible plan as compared to the old, fixed plan. In step 178, the employer set a dollar amount for this target, i.e., a constant was set. (Similarly in the above described embodiment, the targets $DISP_{MAX}$ and flexible credit FC were set as constants.) In an alternative embodiment of this invention, these and other targets can be defined as variables to be determined when the linear equations are solved in step 190 so that a key objective is preferentially addressed, but a subordinate objective of the same type is also recognized.

For example as indicated in step 178, an employer may view $TARGET_T$ as a savings target that must be met, and equation (8) was so structured to reflect that objective with the variable $MISS_T$ being introduced into the objective row (3) to reflect the amount of failure to meet that objective. If the employer further desired any additional savings that might be realized above $TARGET_T$ up to $TARGET_T'$ to be equally beneficial from its perspective as an added value of its plan to the employees, then a new equation similar to (8) may be constructed as follows:

$$SAVE_T - TARGET_T' + MISS_T' \geq 0 \quad (14)$$

Consider now the effect of inserting the independent variable $MISS_T'$ into the objective row (3). Since the coefficient of the added value to the employee of the new flexible plan $ADDEMP_T$ is set with the highest priority in the objective row (3), in order to have equal counter weighing, the coefficient of $MISS_T'$ in the objective row would need to be −1. If, alternatively, the employer were to weigh the variable $MISS_T'$ at half of the weight of the added value $ADDEMP_T$ of the new benefit plan to the employees, then the coefficient of $MISS_T'$ would be −0.5.

Step 198 may in one illustrative embodiment of this invention be implemented by a matrix generator. The modification of the linear or mixed integer program may be accomplished manually, or, if produced by a matrix generator, then by alteration of that matrix generator. Generally, such a matrix generator permits an operator without significant technical training in computers or mathematics to compose and enter instructions in nontechnical language which direct the generator of step 198 to change its priorities by any of the above described procedures. A manual change is usually quite simple for the comparability small models of this invention: Typically, linear programming computer software program, such as that noted above, may have sections for: 1) defining the sequential ordering of the variables, 2) definition of the objective row, 3) statements of constraining equations, and 4) any bounds to independent variables. It is straight forward for one skilled in this technology to modify any of these directly to achieve a desired alternative result.

Step 190, as discussed above with respect to FIG. 4, described linear programming for solving the set of linear equations (2)–(11). In a further embodiment of this invention, that linear programming may include mixed integer programming, which processing is available in the commercially linear programming software noted above. The structuring of equations in mixed integer programming is done similarly as when none of the variables is required to be an integer. The only difference is that certain of the variables can be specified to assume solely integer values; as with linear programming, all other variables are allowed to assume any value consistent with the equation constraints.

Mixed integer programming permits the processing of both integer variables and variables that need not have integer values. An illustration of the use of such programming is set out as follows: Often, the time period of interest is a year. An employer wishes, for simplicity of its employees' calculations, that the employee contributions toward health cost is to be some multiple of $10 on a monthly basis, which would thus be a multiple of 12×$10=$120 on an annual basis. Instead of using equation (5) as structured above, one might define each variable $EE'_{Ai}$ to be equal to $EE_{Ai}/120$, and restate equation (5) as:

$$EE'_{Ai} + ER_{Ai}/120 - A_i/120 = 0, \qquad (15)$$

where $EE'_{Ai}$ must assume a non-negative integer value. Alternatively, if the particular mixed integer capability of the software permitted the integer values for a variable to be specified as multiples of some constant, here that constant would be 120 for $EE_{Ai}$ and equations (5) would be left intact in the original form.

A particular form of the use of mixed integer feature in linear programming is the use of binomial variables, i.e., variables to be allowed to have a value of only 0 or 1. An example of the use of a binomial variable is as follows: An employer deems that once it has achieved its savings target $TARGET_T$, it would like to provide a new, mandated benefit of group long term disability for its entire employee population even before trying to level the disparity variable $DISP_{MAX}$ between the most and least richly benefited employee classes. Then, for equation (6) for determining the total employer cost $COST_T$ for the new plan of flexible benefits, instead of treating the cost of long term disability, say benefit J, as a constant $J_c$, one could create J as a binary variable which has a coefficient in the form of constant $J_c$ in equation (6) that is the cost of that benefit. In the objective row (3), one would introduce a penalty $-M_1'$ that is an order of magnitude greater than $-M_3$, but also an order of magnitude smaller than $-M_4$. In this manner, the long term disability coverage will be introduced into the mixed integer programming as a priority below the targeted cost savings but above a reduction in disparity between the most and least richly benefited employee classes. Thus, when the set of linear equations, now including the equation (6) as modified to include the binary variable J, are solved, the solved value of this binary variable $I_c$ may be either a "0" as would indicate that the long term disability insurance would not be included in the new plan of flexible benefits or a "1" as would indicate that the disability insurance was to be included within the plan. Thus, the use of such binary variables and the linear programming provides a mechanism for deciding whether or not a particular benefit is to be included within a proposed benefit plan in accordance with the prioritized sequence of employer goals.

This invention is not only applicable to optimization models for which constraints are defined as linear relationships, but also for which the objective row need not be solely the sum of first order (linear) variables but may include higher or lower order expressions and/or variables as well. When a substantial deviation from a target savings $TARGET_T$ is considered by the employer to be a much greater concern than a small deviation, the priority or significance of any deviation from the target savings, i.e., the variable $MISS_T$, may be enhanced by squaring the variable $MISS_T$ in the objective row. Thus when any deviation from the target savings occurs, the resultant penalty is squared, in contrast to the linear scaler penalty, which occurs when the coefficient is the variable $MISS_T$ as would be the case with the linear programming described above. There are further commercially available programs, which can handle models with linear constraint rows but also with non-linear objective rows.

This invention also contemplates the use of the sensitivity analysis, which is included in selected of the above noted linear programming software programs. For example in linear programming, a shadow cost is the decrease in optimal value of the objective row resulting from a unit increase in a non-basis variable, assuming the final basis remains feasible. This can be a useful analysis tool in a number of respects. It can be used to identify the cost of certain limits that the employer has placed on its requirements. Since some of those requirements (such as for example a dollar savings $SAVE_T$ to be realized) may not necessarily be intended as an exact amount, it may be helpful to convey the impact of a change in such requirements on the objective row in case the employer may wish to consider such a change.

Another sensitivity measure is a shadow price. This measure indicates the unit worth or adverse impact produced by a row that, respectively, specifies resources provided or constraints required.

Also potentially useful as a row related statistic is slack, if any, in that row in the optimum solution; slack indicates how much that resource may be reduced, or a constraint eased, without impacting the optimum solution.

Upper or lower activity levels often displayed with a shadow value indicate how far that variable or constraint may be changed, without changing other constraints and still have those same shadow costs or shadow pricing prevail. Activity levels may be useful, for example, in the hierarchical objective approach illustrated for this invention. An employer may consider the desirability of easing a particular constraint by the amount of that activity level in order for other considerations to apply in the subsequent analysis using the linear program approach.

For linear programming software, such as that described above, sensitivity capabilities are normally furnished. For non-linear programming, when not furnished, such sensitivities can be obtained by sequentially altering variable bounds or constraint limits and obtaining model results.

What is claimed is:

1. A method of devising the financial aspects of a plan of benefits for a population of employees in accordance with a plurality of goals of an employer of the employees, each of the benefits having a cost, said method comprising the steps of:

a) entering data concerning the population of employees and a rate for each of the benefits into a memory of a computer system;

b) defining a first set of cost variables reflecting respectively a contribution made by the employer to the costs of the benefits, an employee cost of the benefits provided to each employee and, to the extent that the employer's contribution is insufficient to pay for the employee benefits, an employee contribution made by each employee to the cost of his/her employee benefits, and entering the defined variables into the memory of the computer system;

c) defining a second set of goal variables selected from said first set of variables reflecting the goals of the employer for the plan of benefits and entering the second set of variables into the memory of the computer system;

d) structuring the first and second sets of variables into a set of relationships; and e) processing the set of relationships to determine the amounts of these cost variables.

2. A method of devising the financial aspects of a plan of benefits for employees in accordance with a plurality of goals and a plurality of priorities set by an employer of the employees, said method comprising the steps of:

a) receiving and entering data concerning a current population of the employer's employees and a current charge rate for each benefit of the plan into a memory of a computer system;

b) classifying the current population of the employees into respective ones of a plurality of classes;

c) setting variables reflecting a set of costs of the benefits for each of the classes of employees and the goals of the plan;

d) constructing the cost and the goal variables into a set of relationships; and e) solving the set of relationships to provide solutions of the cost and goal variables for each of the classes.

3. A method of devising the financial aspects of a new plan of benefits in accordance with a set of goals of an employer and comparing the financial aspects of the new plan with a present plan of benefits for a common population of employees and comparable benefits, said method comprising the steps of:

a) entering data into a memory of a computer system reflecting a common population of employees, the benefits of the present plan and a pool of benefits from which at least some of the benefits of the new plan may be selected and a set of costs for each of the benefits of the present plan and of the pool;

b) entering data into the memory reflective of the benefits selected from the benefit pool by each employee of the common population;

c) defining variables reflecting the costs of the benefits of the present plan and the selected benefits of the new plan;

d) selecting and structuring a first set of variables from the cost variables defined in step c) into a set of relationships;

e) selecting from the first set of variables a second set of variables and structuring the second set of variables to reflecting the employer's goals into an objective relationship; and f) processing the set of relationships of the first set of variables and the objective relationship of the second set of variables to provide an optimum solution of the cost variables.

4. The method of devising and comparing the financial aspects of the present and new plans of benefits as claimed in claim 3, wherein the cost variables defined in step c) include at least one variable reflective of that relationship between the costs of the new and present plans as set by the employer.

5. The method of devising and comparing the present and new plans of benefits as claimed in claim 4, wherein step f) solves the set of relationships of the first set of variables and the objective relationship of the second set of variables to provide an optimum solution of said cost relationship variable.

6. A method of devising the financial aspects of a plan of benefits for a given population of employees in accordance with goals set by an employer of the employees, said method comprising the steps of:

a) entering data into a memory of a computer system reflective of the employees, a set of costs of the benefits and the employer's goals;

b) defining and entering variables into the memory reflecting the costs of the benefits;

c) constructing a set of relationships of the costs in a manner to constrain the cost variables in accordance with the plan of benefits; and d) processing the set of relationships in the computer system to provide at least one solution of the cost variables.

7. The method of devising the financial aspects of a benefit plan as claimed in claim 6, wherein step b) defines a target variable defining as a target amount of a cost of a particular benefit.

8. The method of devising the financial aspects of a benefit plan as claimed in claim 8, wherein step b) defines the target variable as the difference between the target amount and an actual amount of the particular benefit cost, and step d) solves said set of relationships to provide a solution of said target variable.

9. The method of devising the financial aspects of a benefit plan as claimed in claim 6, wherein step c) constructs one of the set of relationships to reflect a total cost of the benefits of the plan as the sum of the costs of each benefit of the plan.

10. The method of devising the financial aspects of a benefit plan as claimed in claim 6, wherein step c) constructs one of the set of relationships to reflect a total cost of the benefits to each employee as the sum of a contribution made by the employer to such employee for his/her benefits and a contribution made by the employee for his/her benefits.

11. Data processing apparatus for devising in accordance with a set of goals ranked in accordance with a set of priorities determined by an employer the financial aspects of a plan of benefits for a given population of the employer's employees, said apparatus comprising:

a) a memory for storing a variables solving program;

b) means for inputting into said memory data reflecting the employees, variables indicative of a set of costs of the benefits, variables defining the goals to be set by the plan, a set of relationships including a first set of selected variables to constrain the cost variables and an objective relationship including a second set of variables selected from the first set of variables in accordance with the goals;

c) means for executing the variables solving program to obtain a sequence of sets of optimum solutions as to an amount of the cost variables, each set of optimum solutions reflecting a different one of the set of priorities;

d) means for displaying the optimum solutions of the cost variables to the employer; and e) means responsive to the employer's input for repetitively altering the set of priorities as stored in said memory, whereby each set of optimum solutions reflects its priority.

12. A method of devising the financial aspects of a plan of benefits for a given population of employees in accordance with a set of goals ranked by an employer of the employees, each benefit has a cost, said method comprising the steps of:

a) defining variables reflecting respectively the costs of the benefits;

b) structuring a set of relationships employing a first set of cost variables;

c) structuring an objective relationship to include a second set of variables selected from the first set of variables dependent on the set of goals of the employer;

d) entering and assigning priorities set by the employer in a ranked order to selected of the second set of variables; and e) processing the set of relationships and the objective relationship to provide at least one optimum solution of the cost variables in accordance with the ranked goals.

13. The method of devising the financial aspects of a benefit plan as claimed in claim 12, wherein there is farther included a step of displaying the optimum solution of the cost variables for review by the employer.

14. The method of devising the financial aspects of a benefit plan as claimed in claim 12, wherein the set of relationships structured by step b) includes a set of linear equations.

15. The method of devising the financial aspects of a benefit plan as claimed in claim 14, wherein said objective relationship structured in step c) is an objective row.

16. The method of devising the financial aspects of a benefit plan as claimed in claim 15, wherein step d) assigns priorities by inserting a plurality of coefficients into the objective row, each coefficient being related to a corresponding objective variable and its amount set in accordance with the set of ranked goals of the employer.

17. A method of devising the financial aspects of a first plan of benefits and comparing the financial aspects of the first plan with the financial aspects of a second plan, each benefit having a cost, said method comprising the steps of:

a) defining variables reflecting the costs of the benefits included within the first and second plans, at least one of the variables defining a cost relationship between the first and second plans as set by the employer;

b) structuring a set of relationships employing selected of the cost variables; and c) processing the set of relationships to provide solutions of the cost variables and of the cost relationship variable.

18. A method of devising the financial aspects of a plan of benefits selected by each of a population of employees from a pool of benefits provided by an employer of the employees, said method comprising:

a) entering data into a memory of a computer system reflecting a status of the employees, the benefits of the pool, a charge rate of the benefits and a monetary contribution made by the employer to selected of the benefits of the pool;

b) inputting and entering data into the memory reflective of the benefits selected by each employee from the pool;

c) defining variables reflecting the costs of the benefits of the pool and the monetary contribution made by the employer, and a set of objectives for the new plan as selected by the employer;

d) structuring a set of relations employing the cost and objective variables; and e) processing the set of relationships to provide solutions of the cost variables.

19. A method of devising the financial aspects of a plan of benefits for a population of employees, each benefit having a cost, said method comprising the steps of:

a) entering data reflecting the population of employees, a charge rate for each benefit and a contribution made by an employer of the employees to each employee of the population, and a total of the costs of the benefits for each employee of the population being charged to the employer's contribution to that employee;

b) defining a first set of variables reflecting the employer's contribution to each of the employees and a contribution from each employee as to any insufficiency between the costs of the benefits to that employee and the employer's contribution to that employee;

c) defining a second set of variables reflecting the objectives of the employer for the plan of benefits;

d) structuring the first set of variables into a set of relationships; and e) processing the set of relationships to determine respectively the employer's and employee's contributions.

20. The method of devising the financial aspects of a plan of benefits as claimed in claim 19, wherein there is included a pool of benefits from which each employee may select at least some of the benefits in the employee's plan, step a) further includes entering the charge rate for each benefit in the pool and there is further included the step of inputting and entering into a memory data reflective of the benefits selected by each of the employees from the pool.

21. Data processing apparatus for devising in accordance with a set of goals of an employer for the financial aspects of a plan of benefits for a population of the employer's employees, said apparatus comprising:

a) a memory that stores executable linear programming software and variables;

b) a data inputer that inputs data into said memory reflecting a status of each of the employees, the variables being indicative of the costs of the benefits and of the goals of the employer for its plan of benefits, a set of linear equations including a first set of selected ones of the variables to constrain the cost variables and an objective row including a second set of the variables selected from the first set of variables in accordance with the set of goals, and c) a control processing unit that calls and executes the linear programming software to solve the linear equations and, thus, to obtain an optimum set of solutions of the cost variables.

22. Data processing apparatus as claimed in claim 21, wherein there is further include a display that presents said set of solutions to the employer.

23. Data processing apparatus as claimed in claim 21, wherein the employer has a set of priorities for ranking the set of goals, said data inputer inputs the set of priorities into said memory, said control processing unit executes the linear programming software to provide and enter a set of coefficients into the objective row, whereby each coefficient is associated with a corresponding one of the variables of the second set to impart a given priority to its associated variable.

24. Data processing apparatus as claimed in claim 21, wherein the programming software is linear programming software.

25. A method of devising the financial aspects of a plan of benefits for employees in accordance with a plurality of goals and a plurality of priorities set by an employer of the employees, said method comprising the steps of:

a) receiving and entering data concerning the status of a current population of the employer's employees and a current charge rate for each benefit of the plan into a memory of a computer system;

b) classifying a current population of employees into respective ones of a plurality of classes;

c) setting variables reflecting a set of costs of the benefits for each of the classes of employees, the goals of the plan and a variable reflective of a goal of the employer to reduce the difference between the set of costs of the benefits to one of the plurality of classes of employees and the set of costs of the benefits to another of the plurality of classes of employees;

d) constructing the cost and the goal variables into a set of relationships; and e) solving the set of relationships to provide solutions of the cost and goal variables for each of the classes.

26. A method of devising the financial aspects of a plan of benefits for a population of employees, wherein there is included a pool of benefits from which each employee may select at least some of the benefits in an employee's plan and an employer's contribution includes a monetary incentive related to selected of the benefits included within the pool, said method comprising the steps of:

a) entering data reflecting the population of employees, a charge rate for each of the benefits and the employer's contribution to each employee of the population, the cost of the benefits for each employee of the population being charged to employer's contribution to that employee and a charge rate for each benefit in the pool;

b) defining cost variables reflecting the employer's contribution to each of the employees and a contribution from each employee as to any insufficiency between the costs of the benefits to that employee and the employer's contribution to that employee;

c) defining a set of objective variables reflecting a set of objectives of the employer for the plan of benefits and the monetary incentive;

d) structuring the cost variables reflecting the employer's and employee's contributions and the objective variables into a set of relationships;

e) processing the set of relationships to determine respectively the amounts of the employer's and employee's contributions; and f) inputting and entering into a memory data reflective of certain benefit selections made from the pool by each of the employees.

27. The method of devising the financial aspects of a plan of benefits as claimed in claim 26, wherein at least one of the benefits of the pool includes a plurality of levels of coverage, and the employer's contribution includes a like plurality of monetary incentives corresponding respectively to the levels of coverage, step c) further defines a like plurality of variables reflective of the plurality of coverage levels, and step a) enters into the memory data reflective of the employee's selection of a coverage level.

* * * * *